(12) United States Patent
Fukui

(10) Patent No.: US 9,007,486 B2
(45) Date of Patent: Apr. 14, 2015

(54) IMAGE CAPTURING APPARATUS AND CONTROL METHOD THEREOF

(75) Inventor: Takaaki Fukui, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 26 days.

(21) Appl. No.: 13/592,868

(22) Filed: Aug. 23, 2012

(65) Prior Publication Data

US 2012/0314095 A1 Dec. 13, 2012

Related U.S. Application Data

(63) Continuation of application No. 12/694,111, filed on Jan. 26, 2010, now Pat. No. 8,355,059.

(30) Foreign Application Priority Data

| Feb. 6, 2009 | (JP) | 2009-026694 |
| Feb. 6, 2009 | (JP) | 2009-026695 |
| Feb. 17, 2009 | (JP) | 2009-034392 |

(51) Int. Cl.
  *H04N 5/235* (2006.01)
  *H04N 5/232* (2006.01)
  *H04N 5/243* (2006.01)
  *H04N 9/68* (2006.01)

(52) U.S. Cl.
  CPC .......... *H04N 5/2351* (2013.01); *H04N 5/23219* (2013.01); *H04N 5/2355* (2013.01); *H04N 5/243* (2013.01)

(58) Field of Classification Search
  CPC .............................. H04N 5/243; H04N 5/2176
  USPC ............... 348/229.1, 234, E05.037, E09.053, 348/E09.04
  See application file for complete search history.

(56) References Cited

U.S. PATENT DOCUMENTS 4,748,677 A * 5/1988 Yokomizo ............. 382/270
7,646,407 B2 1/2010 Fossum et al.
(Continued)

FOREIGN PATENT DOCUMENTS

| EP | 1 761 040 A2 | 3/2007 |
| JP | 63-202187 A | 8/1988 |

(Continued)

OTHER PUBLICATIONS

XP-002580890, Konstantin Tovstiadi, "Best quality pictures with the Olympus e-510: Part III-ISO", Oct. 26, 2007. (URL:http://kt.mikt.net/serendipity/index.php?/archives/63-Best-quality-pictures-with-the-Olympus-e-510-Part- IIISO.html).

(Continued)

*Primary Examiner* — Hung Lam
(74) *Attorney, Agent, or Firm* — Cowan, Liebowitz & Latman, P.C.

(57) ABSTRACT

An image capturing apparatus determines a scene of a captured image, and, depending on the scene determination result, performs image capture with an expanded dynamic range, or performs a dynamic range contraction process based on the captured image. In the case of executing the dynamic range expansion process, the image capturing apparatus performs image capture at a decreased ISO speed, and performs tone correction for compensating the decrease in ISO speed with respect to the captured image. The image capturing apparatus is thereby capable of performing image capture with a dynamic range that takes into consideration the subject and the scene.

23 Claims, 20 Drawing Sheets

(56) References Cited

U.S. PATENT DOCUMENTS

| | | |
|---|---|---|
| 8,120,667 B2 * | 2/2012 | Mizuno et al. .............. 348/222.1 |
| 2005/0185223 A1 * | 8/2005 | Takahashi et al. ........... 358/3.26 |
| 2007/0081721 A1 * | 4/2007 | Xiao et al. .................... 382/167 |
| 2007/0103706 A1 | 5/2007 | Bing et al. |
| 2007/0115369 A1 * | 5/2007 | Utagawa ..................... 348/222.1 |
| 2007/0263097 A1 * | 11/2007 | Zhao et al. ................. 348/221.1 |
| 2008/0187235 A1 | 8/2008 | Wakazono et al. |
| 2008/0211923 A1 * | 9/2008 | Watanabe ................... 348/222.1 |
| 2009/0167751 A1 * | 7/2009 | Kerofsky ....................... 345/214 |
| 2009/0174808 A1 | 7/2009 | Mochida et al. |
| 2009/0303345 A1 * | 12/2009 | Deguchi et al. ............ 348/223.1 |
| 2010/0123805 A1 * | 5/2010 | Craig et al. .............. 348/240.99 |
| 2010/0157112 A1 * | 6/2010 | Miyagi ........................ 348/242 |
| 2010/0220223 A1 * | 9/2010 | Tsuruoka ..................... 348/242 |
| 2011/0170775 A1 * | 7/2011 | Manabe ........................ 382/167 |
| 2011/0255766 A1 * | 10/2011 | Heath et al. .................. 382/132 |

FOREIGN PATENT DOCUMENTS

| | | |
|---|---|---|
| JP | 05-158103 A | 6/1993 |
| JP | 2006-165725 A | 6/2006 |
| JP | 2007-324856 A | 12/2007 |
| JP | 2008-131530 A | 6/2008 |
| JP | 2009-008961 A | 1/2009 |
| JP | 2009-017229 A | 1/2009 |

OTHER PUBLICATIONS

European Search Report issued on Jan. 20, 2014, corresponding European Patent Application No. 13168007.6.

* cited by examiner

| | -1 | |
|---|---|---|
| -1 | 4 | -1 |
| | -1 | |

FIG. 10A

| AUTO | 0/3 STEPS | BACKGROUND | | | | | | |
|---|---|---|---|---|---|---|---|---|
| | | 0/3 STEPS | 1/3 STEPS | 2/3 STEPS | 3/3 STEPS | 4/3 STEPS | 5/3 STEPS | 6/3 STEPS |
| FACE | 0/3 STEPS | 0 | 1/3 STEPS | 2/3 STEPS | 3/3 STEPS | 3/3 STEPS | 3/3 STEPS | 3/3 STEPS |
| | 1/3 STEPS | 1/3 STEPS | 1/3 STEPS | 2/3 STEPS | 3/3 STEPS | 3/3 STEPS | 3/3 STEPS | 3/3 STEPS |
| | 2/3 STEPS | 2/3 STEPS | 2/3 STEPS | 2/3 STEPS | 3/3 STEPS | 3/3 STEPS | 3/3 STEPS | 3/3 STEPS |
| | 3/3 STEPS | 3/3 STEPS | 3/3 STEPS | 3/3 STEPS | 3/3 STEPS | 3/3 STEPS | 3/3 STEPS | 3/3 STEPS |

FIG. 10B

| LANDSCAPE MODE | 0/3 STEPS | BACKGROUND | | | | | | |
|---|---|---|---|---|---|---|---|---|
| | | 0/3 STEPS | 1/3 STEPS | 2/3 STEPS | 3/3 STEPS | 4/3 STEPS | 5/3 STEPS | 6/3 STEPS |
| FACE | 0/3 STEPS | 0 | 0 | 1/3 STEPS | 3/3 STEPS | 3/3 STEPS | 3/3 STEPS | 3/3 STEPS |
| | 1/3 STEPS | 0 | 1/3 STEPS | 1/3 STEPS | 3/3 STEPS | 3/3 STEPS | 3/3 STEPS | 3/3 STEPS |
| | 2/3 STEPS | 1/3 STEPS | 1/3 STEPS | 2/3 STEPS | 3/3 STEPS | 3/3 STEPS | 3/3 STEPS | 3/3 STEPS |
| | 3/3 STEPS | 2/3 STEPS | 2/3 STEPS | 2/3 STEPS | 3/3 STEPS | 3/3 STEPS | 3/3 STEPS | 3/3 STEPS |

FIG. 10C

| PORTRAIT MODE | BACKGROUND | | | | | | | |
|---|---|---|---|---|---|---|---|---|
| | 0/3 STEPS | 1/3 STEPS | 2/3 STEPS | 3/3 STEPS | 4/3 STEPS | 5/3 STEPS | 6/3 STEPS |
| FACE | 0/3 STEPS | 0 | 0 | 1/3 STEPS | 2/3 STEPS | 3/3 STEPS | 5/3 STEPS | 6/3 STEPS |
| | 1/3 STEPS | 1/3 STEPS | 1/3 STEPS | 1/3 STEPS | 2/3 STEPS | 3/3 STEPS | 3/3 STEPS | 3/3 STEPS |
| | 2/3 STEPS | 2/3 STEPS | 2/3 STEPS | 2/3 STEPS | 2/3 STEPS | 3/3 STEPS | 3/3 STEPS | 3/3 STEPS |
| | 3/3 STEPS | 3/3 STEPS | 3/3 STEPS | 3/3 STEPS | 3/3 STEPS | 3/3 STEPS | 3/3 STEPS | 3/3 STEPS |

FIG. 10D

| FOR BACKLIGHT SCENE | BACKGROUND | | | | | | | |
|---|---|---|---|---|---|---|---|---|
| | 0/3 STEPS | 1/3 STEPS | 2/3 STEPS | 3/3 STEPS | 4/3 STEPS | 5/3 STEPS | 6/3 STEPS |
| FACE | 0/3 STEPS | 0 | 1/3 STEPS | 2/3 STEPS | 3/3 STEPS | 4/3 STEPS | 5/3 STEPS | 6/3 STEPS |
| | 1/3 STEPS | 1/3 STEPS | 2/3 STEPS | 2/3 STEPS | 3/3 STEPS | 4/3 STEPS | 5/3 STEPS | 6/3 STEPS |
| | 2/3 STEPS | 2/3 STEPS | 2/3 STEPS | 3/3 STEPS | 3/3 STEPS | 4/3 STEPS | 5/3 STEPS | 6/3 STEPS |
| | 3/3 STEPS | 3/3 STEPS | 3/3 STEPS | 3/3 STEPS | 3/3 STEPS | 4/3 STEPS | 5/3 STEPS | 6/3 STEPS |

|  | AE TARGET VALUE | SATURATION SIGNAL AMOUNT LUMINANCE | DYNAMIC RANGE |
|---|---|---|---|
| 0/3 STEPS | 130 | 1024 | 7.9 |
| 1/3 STEPS | 103 | 1024 | 9.9 |
| 2/3 STEPS | 82 | 1024 | 12.5 |
| 3/3 STEPS | 65 | 1024 | 15.8 |

F I G. 12A
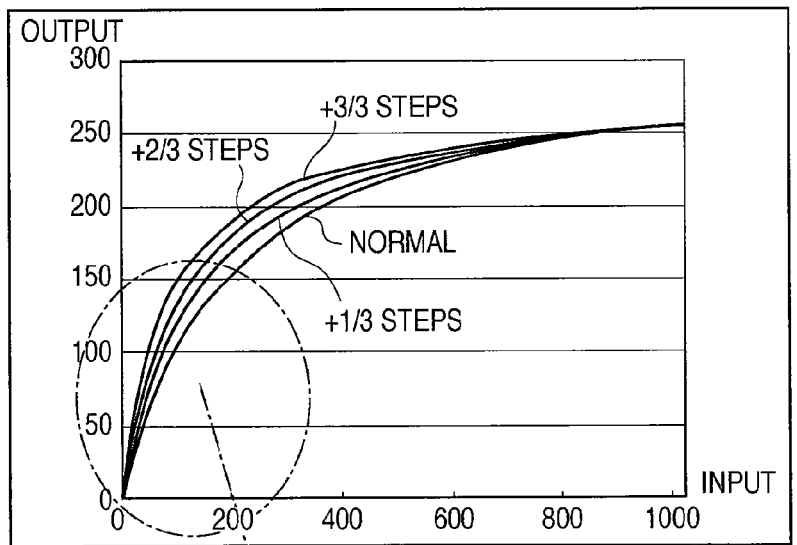
ENLARGED VIEW
F I G. 12B
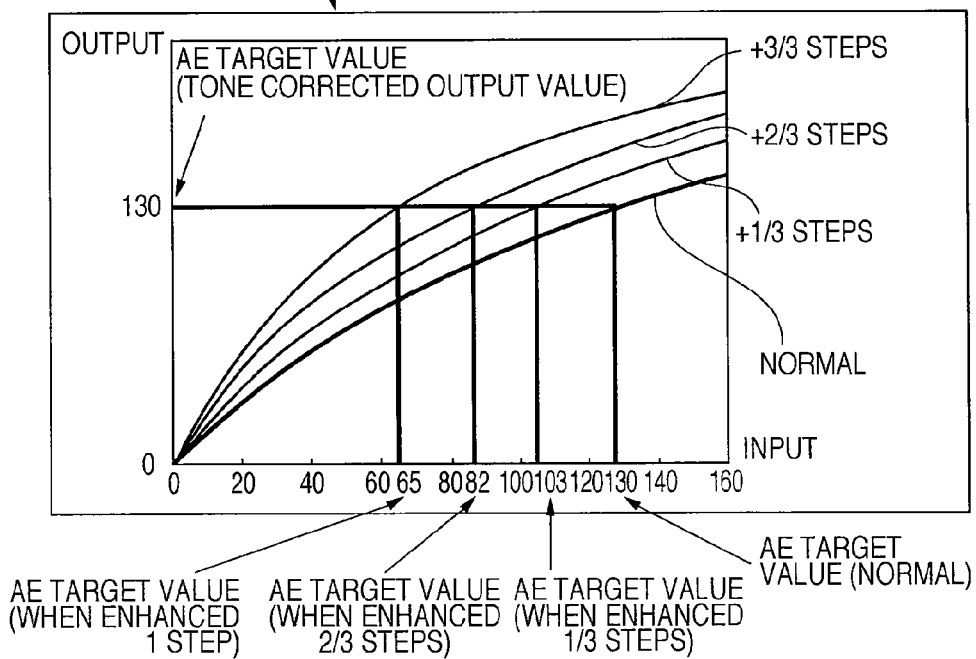

FIG. 16

| ISO SPEED / Gain_Yhp | ISO100 | ISO200 | ISO400 | ISO800 | ISO1600 | ISO3200 |
|---|---|---|---|---|---|---|
| 0-1.06 | 0 | 0 | 0 | 0 | 0 | 0 |
| 1.07-1.18 | 1.12 | 1.12 | 1.12 | 1.12 | 0 | 0 |
| 1.19-1.33 | 1.25 | 1.25 | 1.25 | 1.25 | 0 | 0 |
| 1.34- | 1.41 | 1.41 | 1.41 | 1.41 | 1.12 | 0 |

FIG. 18

| SCENE | NIGHT SCENE | NIGHT SCENE + PERSON | SUNSET SCENE | SUNSET SCENE + PERSON | SUNSET SCENE + PERSON (FLASH) |
|---|---|---|---|---|---|
| AE | ±0Ev | ±0Ev | -2/3Ev | PERSON PRIORITY AE | -2/3Ev |
| SATURATION | NORMAL | NORMAL | ENHANCE RED SATURATION | NORMAL | NORMAL |
| TONE CORRECTION D+ | ○ | ○ | ◎ | ○ | ◎ |
| TONE CORRECTION D− | × | ◎ | ◎ | ○ | ○ |
| TONE CORRECTION FOR NIGHT SCENE | ◎ | ◎ | × | × | × |

| SCENE | BACKLIGHT | BACKLIGHT + PERSON | PERSON | NORMAL | BLUE SKY |
|---|---|---|---|---|---|
| AE | BACKLIGHT | BACKLIT PERSON AE | PERSON PRIORITY AE | ±0Ev | ±0Ev |
| SATURATION | NORMAL | NORMAL | NORMAL | NORMAL | ENHANCE BLUE SATURATION |
| TONE CORRECTION D+ | ○ | ◎ | ○ | ○ | ○ |
| TONE CORRECTION D− | × | ○ | ○ | ○ | ○ |
| TONE CORRECTION FOR NIGHT SCENE | × | × | × | × | × |

| | | | |
|---|---|---|---|
| D+ | NOT IMPLEMENTED | ○ | 0-1 STEPS |
| D− | NOT IMPLEMENTED | 0-0.5 STEPS | 0-2 STEPS |
| TONE CORRECTION FOR NIGHT SCENE | NOT IMPLEMENTED | FILL IN DARK PARTS | − |

IMAGE CAPTURING APPARATUS AND CONTROL METHOD THEREOF

CROSS-REFERENCE TO RELATED APPLICATIONS

This application is a continuation of application Ser. No. 11/694,111, filed Jan. 26, 2010 the entire disclosure of which is hereby incorporated by reference.

BACKGROUND OF THE INVENTION

1. Field of the Invention

The present invention relates to an image capturing apparatus and a control method thereof.

2. Description of the Related Art

Heretofore, digital still cameras and digital video cameras using an image sensor such as a CCD image sensor or a CMOS image sensor have been widely used. However, the dynamic range (latitude) of these image sensors is narrow compared with silver halide film. For this reason, when capturing a high contrast scene, loss of tone detail in low luminance portions (plugged-up shadows) and loss of tone detail in high luminance portions (blown-out highlights) tend to occur.

Systems capable of controlling the dynamic range automatically have been proposed in response to such problems.

For example, in Japanese Patent Laid-Open No. 2005-209012, it is proposed, in the case where it is detected from a captured image that the main subject is backlit or in a high contrast scene, to specify a black saturation point and a white saturation point from a histogram of the image, and perform tone correction such that the brightness of the main subject is correct.

Also, in Japanese Patent Laid-Open No. 2004-186876, it is proposed to acquire two types of images with different dynamic ranges using an image sensor disposed with high sensitivity light receiving elements and low sensitivity light receiving elements, by capturing the same scene with the light receiving elements having different sensitivities, and combine these captured images according to a scene analysis result.

There is also a digital camera (Canon EOS 5D Mark II) that has a shooting mode (highlight tone priority mode) for shifting the sensitivity setting range one step higher and suppressing blown-out highlights in high luminance portions.

However, with the method of Japanese Patent Laid-Open No. 2005-209012, an effect of widening the dynamic range is not obtained, since the points at which the sensor becomes saturated do not change, despite there being an effect of increasing contrast to the eye.

Also, with the method of Japanese Patent Laid-Open No. 2004-186876, an effect of widening the dynamic range is obtained, but there is the problem of the cost involved, since a special image sensor disposed with light receiving elements having different sensitivities needs to be used.

Also, with the digital camera having the tone priority mode, to obtain an image capture result in which blown-out highlights in high luminance portions are suppressed, the user needs to explicitly set the tone priority mode before performing image capture. Also, depending on the scene, there may be cases where the effect of the tone priority mode is not really noticeable or where it would be better to prioritize other conditions rather than suppressing blown-out highlights in high luminance portions when performing image capture. For example, in the case where the subject is a landscape, desirably there are no blown-out highlights in high luminance portions, but in the case where the subject is a person, desirably the brightness of the person's face is correct, even if the background is slightly blown out. In other words, to obtain an appropriate image capture result by making use of the tone priority mode, the user is required to be able to discriminate scenes appropriately, in addition to setting the tone priority mode.

SUMMARY OF THE INVENTION

The present invention has been made in consideration of such problems with the conventional art. The present invention provides an image capturing apparatus and a control method thereof that are capable of performing image capture in a dynamic range that takes into account the subject and the scene.

According to an aspect of the present invention, there is provided an image capturing apparatus comprising: scene determining unit arranged to perform scene determination, based on information regarding a moving image captured prior to the capture of a still image; and control unit arranged to control the image capturing apparatus to capture an image, and to execute, based an output from the scene determination unit, one of (a) a dynamic range expansion process for capturing a still image at a decreased ISO speed, and applying, with respect to a captured still image, tone correction for compensating the decrease in ISO speed, or (b) a dynamic range contraction process for capturing a still image, and applying, with respect to a captured still image, tone correction for increasing the brightness of a low luminance portion of the captured still image, based on a characteristic of a high luminance portion of the moving image or the captured still image.

According to an aspect of the present invention, there is provided a control method of an image capturing apparatus, comprising: a scene determining step of performing scene determination, based on a moving image captured prior to the capture of a still image; and a control step of controlling an image capturing operation, wherein in the control step, based on a result of the scene determination in the scene determining step, one of (a) a dynamic range expansion process for capturing a still image at a decreased ISO speed, and applying, with respect to a captured still image, tone correction for compensating the decrease in ISO speed, or (b) a dynamic range contraction process for capturing a still image, and applying, with respect to a captured still image, tone correction for increasing the brightness of a low luminance portion of the captured still image, based on a characteristic of a high luminance portion of the moving image or the captured still image, is executed.

Further features of the present invention will become apparent from the following description of exemplary embodiments with reference to the attached drawings.

BRIEF DESCRIPTION OF THE DRAWINGS

FIGS. 10A to 10D show specific examples of final amounts of D-range expansion determined according to the size of an amount of D-range expansion for a face region and an amount of D-range expansion amount for an entire image, in the image capturing apparatus according to the embodiment of the present invention.

FIGS. 12A and 12B show an example setting of tone characteristics in a signal processing circuit of the image capturing apparatus according to the embodiment of the present invention.

FIG. 16 shows an example of the relation between final amounts of gain increase that depend on a final value of a gain value Gain_yhp computed at S504 of FIG. 15 and ISO speed, in the image capturing apparatus according to the embodiment of the present invention.

FIG. 18 shows an example of the relation between the setting of exposure control, dynamic range expansion process (D+), dynamic range contraction process (D−), and tone characteristics for a night scene, according to a scene determination result, in the image capturing apparatus according to the embodiment of the present invention.

DESCRIPTION OF THE EMBODIMENTS

Preferred embodiments of the present invention will now be described in detail in accordance with the accompanying drawings.

Figure 1:
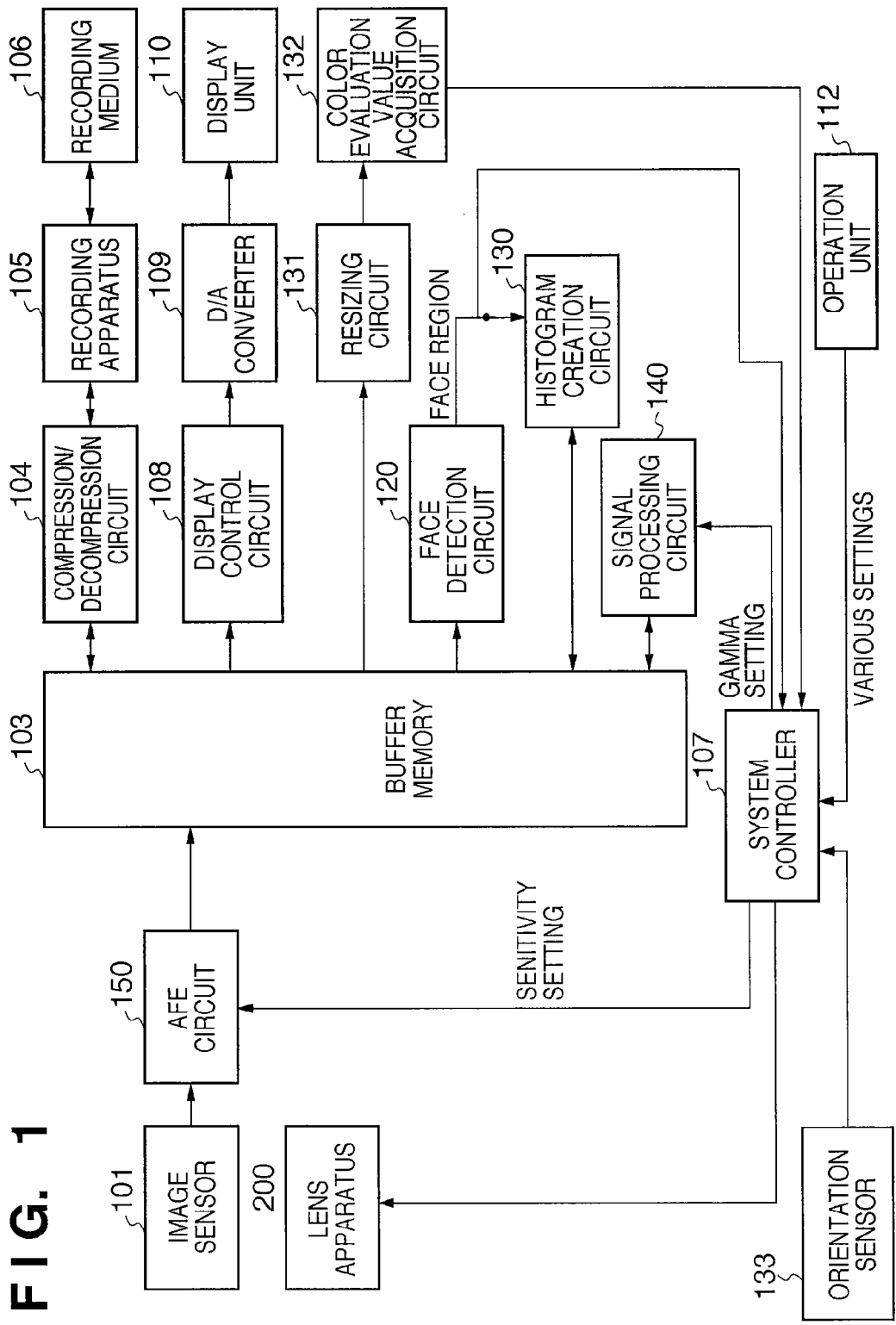
FIG. 1 is a block diagram showing an example configuration of an image capturing apparatus according to an embodiment of the present invention.

FIG. 1 is a block diagram showing an example configuration of an image capturing apparatus according to an embodiment of the present invention. The image capturing apparatus of the present embodiment encompasses arbitrary apparatuses having a function of capturing images using an image sensor. Such apparatuses include mobile telephones, PDAs and personal computers that incorporate or are connected to a camera, as well as digital still cameras and digital video cameras.

In FIG. 1, an operation unit 112 includes buttons, switches or the like, and is used by a user for giving instructions and configuring settings with respect to the image capturing apparatus. The operation unit 112 also includes a shutter button, and, in the present embodiment, is able to detect a half stoke state and a full stroke state of the shutter button.

A system controller 107 perceives a half stroke state of the shutter button as an image capture preparation instruction, and a full stroke state of the shutter button as an image capture start instruction. The system controller 107, for example, includes a CPU, a ROM and a RAM, and controls the overall operation of the image capturing apparatus as a result of the CPU executing a program stored in the ROM, using the RAM.

An orientation sensor 133 detects an orientation of the image capturing apparatus, and outputs a detection result to the system controller 107. The system controller 107 determines whether the orientation of the image capturing apparatus is vertical or horizontal, based on the output from the orientation sensor 133. Note that the orientation sensor 133 may determine whether the orientation of the image capturing apparatus is vertical or horizontal, and output the determination result to the system controller 107.

A lens apparatus 200 has a group of lens including a focus lens, a driving apparatus that drives the focus lens, an aperture and a mechanical shutter, and operates under the control of the system controller 107.

An image sensor 101 is a photoelectric conversion element such as a CCD image sensor or a CMOS image sensor. An analog front end (AFE) circuit 150 performs gain adjustment, A/D conversion and the like on analog image signals output from the image sensor 101, and outputs the result as digital image signals. The AFE circuit 150 will be discussed in detail later.

A buffer memory 103 temporarily stores the digital image signals output by the AFE circuit 150.

A compression/decompression circuit 104 encodes captured image data to an image file (e.g., JPEG file) format for recording, and decodes image files read from a recording medium 106.

A recording apparatus 105 performs reading and writing of data under the control of the system controller 107, with respect to a recording medium 106 such as a built-in memory or a removable memory card.

A display control circuit 108 controls a display operation with respect to a display unit 110 that includes a display device such as an LCD, under the control of the system controller 107.

A D/A converter 109 converts digital image signals for display that are output by the display control circuit 108 to analog image signals that can be displayed by the display unit 110.

The display unit 110 performs display of GUI windows for the user to configure various settings and give instructions with respect to the image capturing apparatus, and display of various types of information relating to the image capturing apparatus, and the like, as well as performing display of captured images. Also, the display unit 110 can be caused to function as an electronic viewfinder (EVF), by sequentially displaying, on the display unit 110, images captured continuously. This sequential image capture/display operation for causing the display unit 110 to function as an EVF is also called "through-the-lens view" or "live view". This sequential image capturing operation is substantively equivalent to an image capturing operation for moving images, and images captured for EVF use and displayed are in effect moving images.

A face detection circuit 120 performs face detection as an example method for detecting a person from a captured image. The face detection circuit 120 performs the face detection process on image data in YUV format or RAW format stored in the buffer memory 103, and outputs a face detection result that includes the size and position of the face region in the image to a histogram creation circuit 130.

There are no particular restrictions on the face detection method used by the face detection circuit 120, and an arbitrary known method can be applied. As for known face detection techniques, many different method have been proposed, including methods based on learning that use neural networks and the like, methods for retrieving sites with characteristic shapes such as the eyes, nose and mouth from an image using template matching, and viewing these sites as a face the higher the degree of similarity, and methods for detecting the amount of image features such as color of skin and shape of eyes, and using statistical analysis on these image features. A plurality of these methods can also be combined to improve the accuracy of face detection. Specific examples include a method of face detection using wavelet transform and image feature amounts disclosed in Japanese Patent Laid-Open No. 2002-251380.

Here, a specific example of a face detection operation of the face detection circuit 120 will be described, with reference to FIG. 2A to FIG. 5A.

Figure 2B:
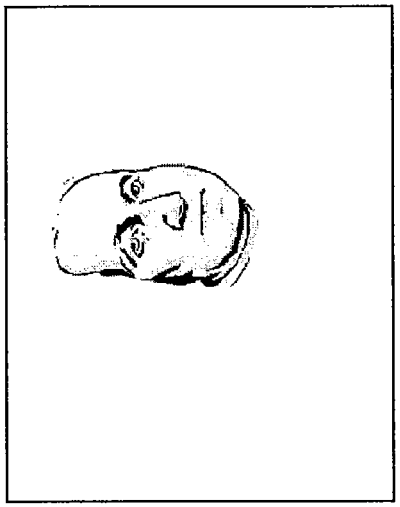
FIGS. 2A to 2D schematically show the process of detecting a face from an original image.
Figure 2D:
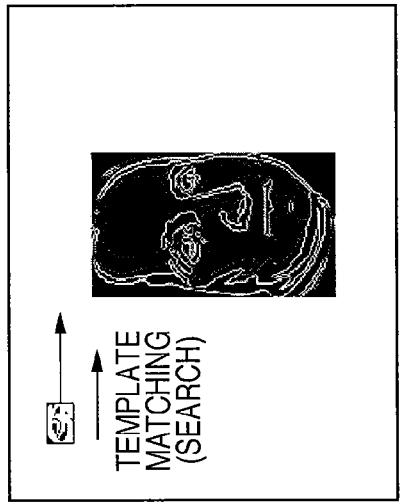
Figure 2A:

FIGS. 2A to 2D schematically show the process of detecting a face from an original image, with FIG. 2A showing the original image.

Figure 3:
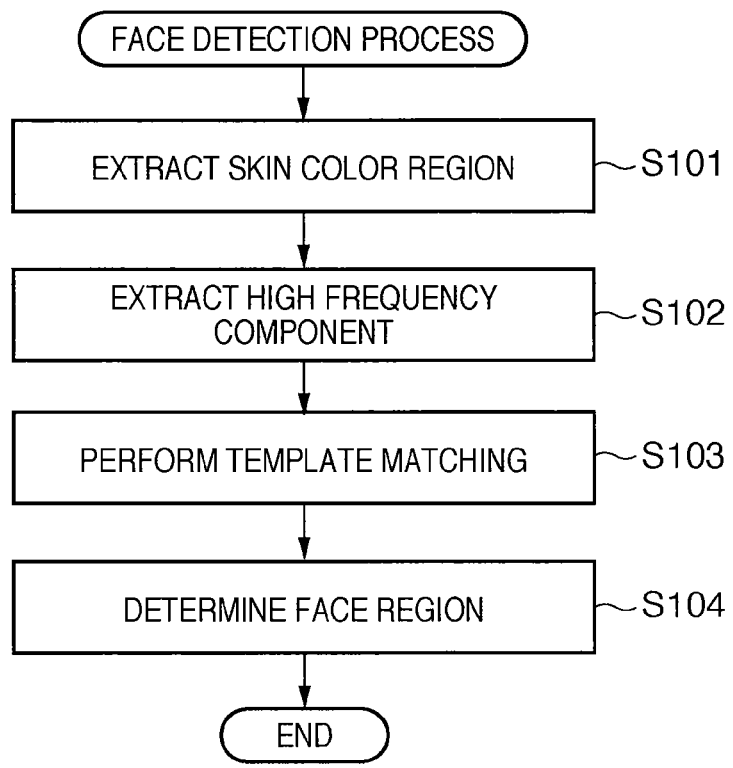
FIG. 3 is a flowchart illustrating a face detection operation in a face detection circuit of the image capturing apparatus according to the embodiment of the present invention.

FIG. 3 is a flowchart illustrating a face detection operation of the face detection circuit 120.

Figure 4:
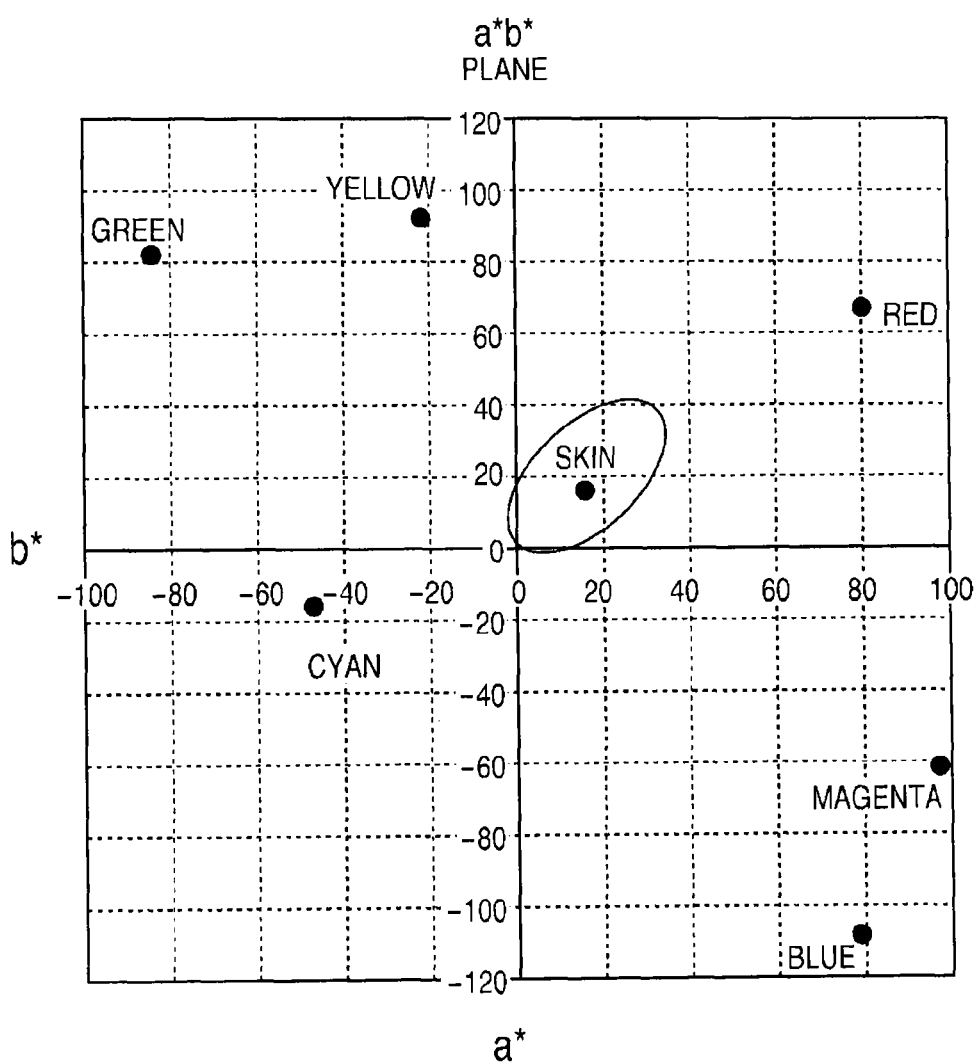
FIG. 4 is a chromaticity diagram showing representative colors in CIE L*a*b* color space.

At S101, the face detection circuit 120 extracts a skin color region from the original image. FIG. 4 is a chromaticity diagram showing representative colors in CIE L*a*b* color space, and the ellipsoid in the middle is the region most likely to be skin color.

The face detection circuit 120 converts the RGB original image data to L*a*b* format with a known method, and extracts a skin color region composed of pixels having the chromaticity of the region shown by the ellipsoid in FIG. 4. FIG. 2B schematically shows the skin color region extracted from the original image.

Figure 2C:
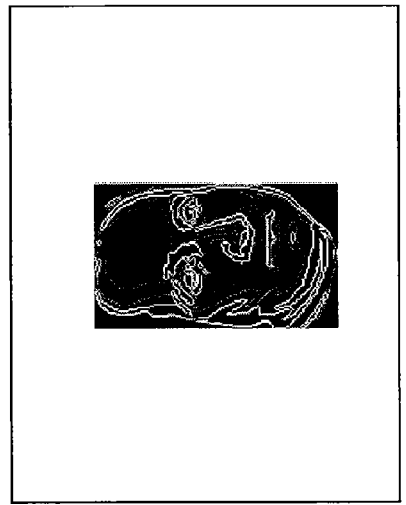
Figures 5A, 5B:
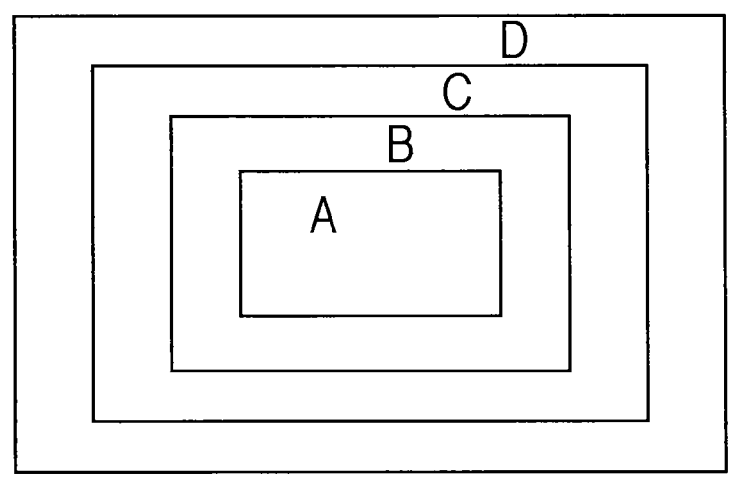
FIG. 5A shows example coefficients of a two-dimensional high-pass filter used by the face detection circuit of the image capturing apparatus according to the embodiment of the present invention.
FIG. 5B shows example region partitioning when determining whether the scene is a backlight scene, in the image capturing apparatus according to the embodiment of the present invention.

Next, at S102, the face detection circuit 120 extracts a high frequency component from the extracted skin color region. Specifically, the face detection circuit 120 applies a high-pass filter to the skin color region. FIG. 5A shows example coefficients of a two-dimensional high-pass filter. An example image obtained by applying the high-pass filter to the image in FIG. 2B is shown in FIG. 2C.

At S103, the face detection circuit 120 performs template matching on the image after application of the high-pass filter, using an eye template such as shown in FIG. 2D, and detects the eyes in the image.

At S104, the face detection circuit 120 determines the face region based on the positional relation of the eye region detected at S103, and the like, and derives a face detection result that includes the position and size of the face region.

Returning to FIG. 1, the histogram creation circuit 130 acquires the detection result of the face region from the face detection circuit 120, and creates a histogram relating to the luminance values of pixels included in the face region. The histogram creation circuit 130 can also create a histogram of the luminance values of pixels that are included, for each of a plurality of partial regions obtained by partitioning the image. Created histograms are stored in the buffer memory 103.

Also, in the case of acquiring color information for each partial region, color information for each partial region is acquired with a color evaluation value acquisition circuit 132, with respect to a contracted image obtained by contracting one screen worth of images for image analysis stored in the buffer memory 103 with a resizing circuit 131. The color information may be color evaluation values such as saturation, hue and luminance, for example.

A signal processing circuit 140 applies signal processing to image data stored in the buffer memory 103, in accordance with signal processing parameters (white balance correction coefficients, tone characteristic parameters, etc.) set by the system controller 107. The signal processing circuit 140 then generates YUV image data, and again stores the image data in the buffer memory 103.

As will be discussed later, the image capturing apparatus of the present embodiment realizes dynamic range control, by sensitivity adjustment (gain adjustment) in the AFE circuit 150 and tone characteristic correction in the signal processing circuit 140.

Figure 6:
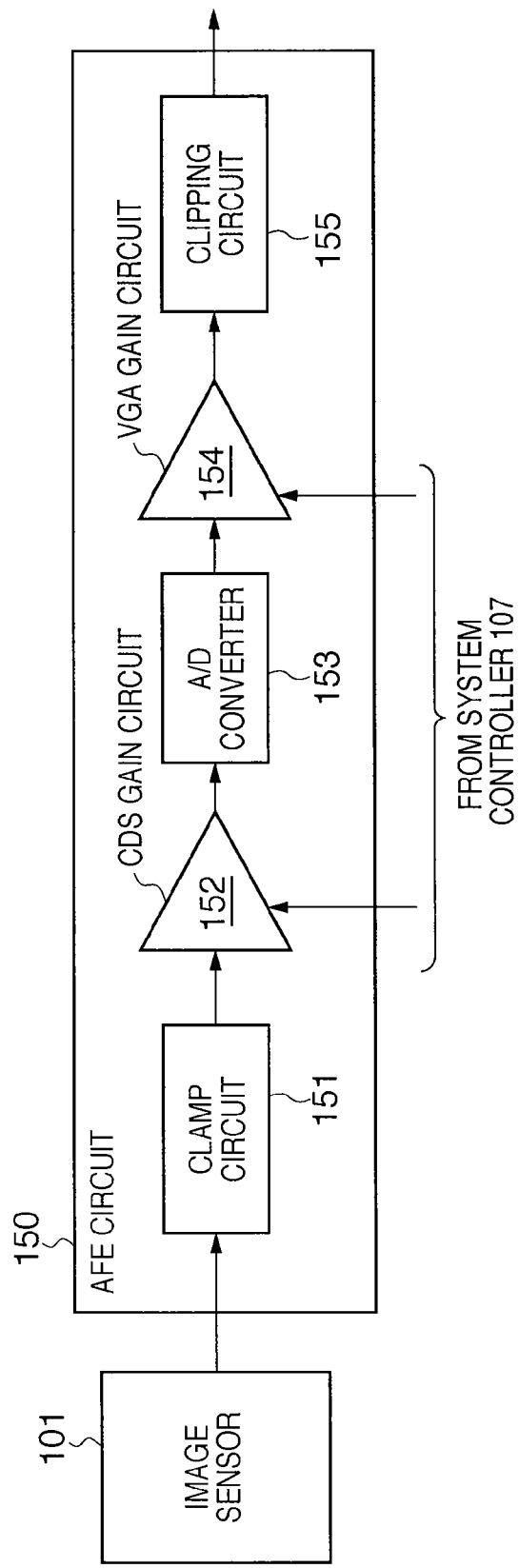
FIG. 6 is a block diagram showing an example configuration of an AFE circuit of the image capturing apparatus according to the embodiment of the present invention.

FIG. 6 is a block diagram showing an example configuration of the AFE circuit 150.

A clamp circuit 151 clamps signals output from the image sensor 101 to a reference black level, such that the output values when the sensor is blocked or the output values of a reference voltage region of the sensor will be zero.

A CDS gain circuit 152 applies a CDS gain (analog gain) to clamped signals. The CDS gain applied by a generic AFE circuit has a discrete value such as 0, 3 or 6 [dB].

Signals to which the analog gain has been applied are converted to digital data by an A/D converter 153. Next, a variable gain amplifier (VGA) gain circuit 154 applies a VGA gain to the digital data. In the present embodiment, the value of the VGA gain is adjustable in 0.125 dB increments in a range of 0 to 36 dB, for example. Signals to which the VGA gain has been applied are output to the buffer memory 103 after being clipped to a prescribed number of bits by a clipping circuit 155.

In the present embodiment, setting of ISO speed in the image capturing apparatus is realized by the system controller 107 controlling the values of the CDS gain and the VGA gain applied by the AFE circuit 150.

Also, sensitivity adjustment for correcting variability in the sensitivity characteristics of the image sensor 101 can be performed, by irradiating the image capturing apparatus with light of a reference light amount, and controlling the CDS gain and VGA gain such that a constant luminance signal value is output from the image capturing apparatus.

In the present embodiment, sensitivity setting is performed by combining the CDS gain and the VGA gain. For example, in the case where a gain of 6 dB in total is set for low sensitivity, the CDS gain is set to 3 dB and the VGA gain is set to 3 dB, for example. Also, in the case where a gain of 24 dB is set for high sensitivity, the CDS gain is set to 6 dB and the VGA gain is set to 18 dB, for example. As abovementioned, since fine setting cannot generally be performed with the CDS gain, an approximate gain is set with the upstream CDS gain, and the VGA gain is controlled in order to perform subtle sensitivity control of a sensitivity adjustment portion or the like.

Generally, a gain circuit also amplifies the noise component at the same time as the signal component. For this reason, in order to suppress amplification of the superimposed noise component with an analog circuit, the upstream CDS gain preferably is set as high as possible, in the combination of the CDS gain and the VGA gain that is able to realize the total gain amount. This setting also enables the effect of being able to effectively maximize the quantization accuracy of the A/D converter 153 to be realized.

Next, operation when image capture is performed in an image capturing apparatus having the abovementioned configuration will be described.

The image capturing apparatus of the present embodiment, during standing by in a shooting mode where an image capture preparation instruction or an image capture start instruction has not been input, captures moving images and causes the display unit 110 to function as an EVF. That is, the system controller 107 executes a process of capturing images continuously at a prescribed rate (e.g., 30 frames/sec.), generating display images from the captured images, and causing the display unit 110 to display the generated display images.

In the case where execution of face detection is set, the face detection circuit 120 performs face detection on the display images (hereafter, also referred to as EVF images), and outputs the detection results to the system controller 107. The system controller 107 then instructs the display control circuit 108 to superimpose a face frame for presenting the detected face region to the user on the EVF images, together with the position information of the face region.

The face detection results are also supplied to the histogram creation circuit 130, and the histogram creation circuit 130 creates histograms from the pixels included in the face region within the EVF images. Also, the histogram creation circuit 130 creates histograms for each of a plurality of regions into which the entire image is partitioned. Created histograms are stored in the buffer memory 103.

Figure 7:
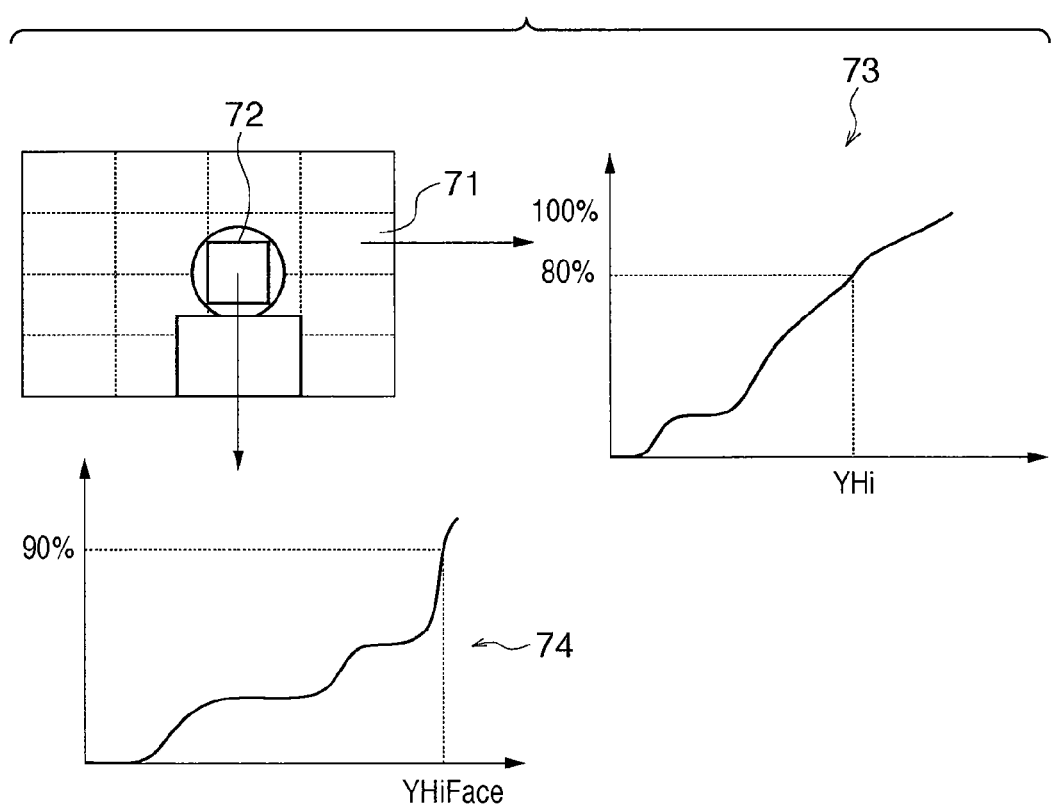
FIG. 7 schematically shows example histograms created by a histogram creation circuit of the image capturing apparatus according to the embodiment of the present invention.

FIG. 7 schematically shows example histograms created by the histogram creation circuit 130 in the present embodiment.

FIG. 7 shows the creation of a histogram 73 for each partial region 71 obtained by quartering an entire image both horizontally and vertically, and a histogram 74 for a face region 72. Note that the histograms 73 and 74 in FIG. 7 are cumulative histograms. Note also that the facial region may be excluded when creating histograms for the partial regions. This enables histograms to be created for the face region and for regions other than the face region (background).

In the present embodiment, a luminance value YHi with a frequency of 80% in the cumulative histogram 73 of the partial regions 71, and a luminance value YHiFace with a frequency of 90% in the cumulative histogram 74 of the face region 72 are used in evaluating the blown-out highlights region of a captured image, such as will be discussed later.

When an image capture start instruction is input by the user pressing the shutter button a full stroke, the system controller 107 performs an image capturing operation based on the processing results of auto exposure control (AE), auto focus detection (AF) and the like. Specifically, the system controller 107 performs image capture by controlling the focal position and aperture of the lens apparatus 200, the mechanical shutter, the image sensor 101, and, further, a flash (not shown) as required.

Analog image signals output from the image sensor 101 are stored in the buffer memory 103 as digital image data, via the abovementioned AFE circuit 150. The signal processing circuit 140 performs processing on this digital image data, in accordance with various signal processing parameters set by the system controller 107, generates YUV image data, and again stores the generated image data in the buffer memory 103.

Image data processed by the signal processing circuit 140 is encoded in a JPEG file, for example, by the compression/decompression circuit 104, and recorded to the recording medium 106 by the recording apparatus 105.

Also, the display control circuit 108 generates a display image from the YUV image data stored in the buffer memory 103, and causes the display unit 110 to display the display image as a quick review image via the D/A converter 109.

Figure 8:
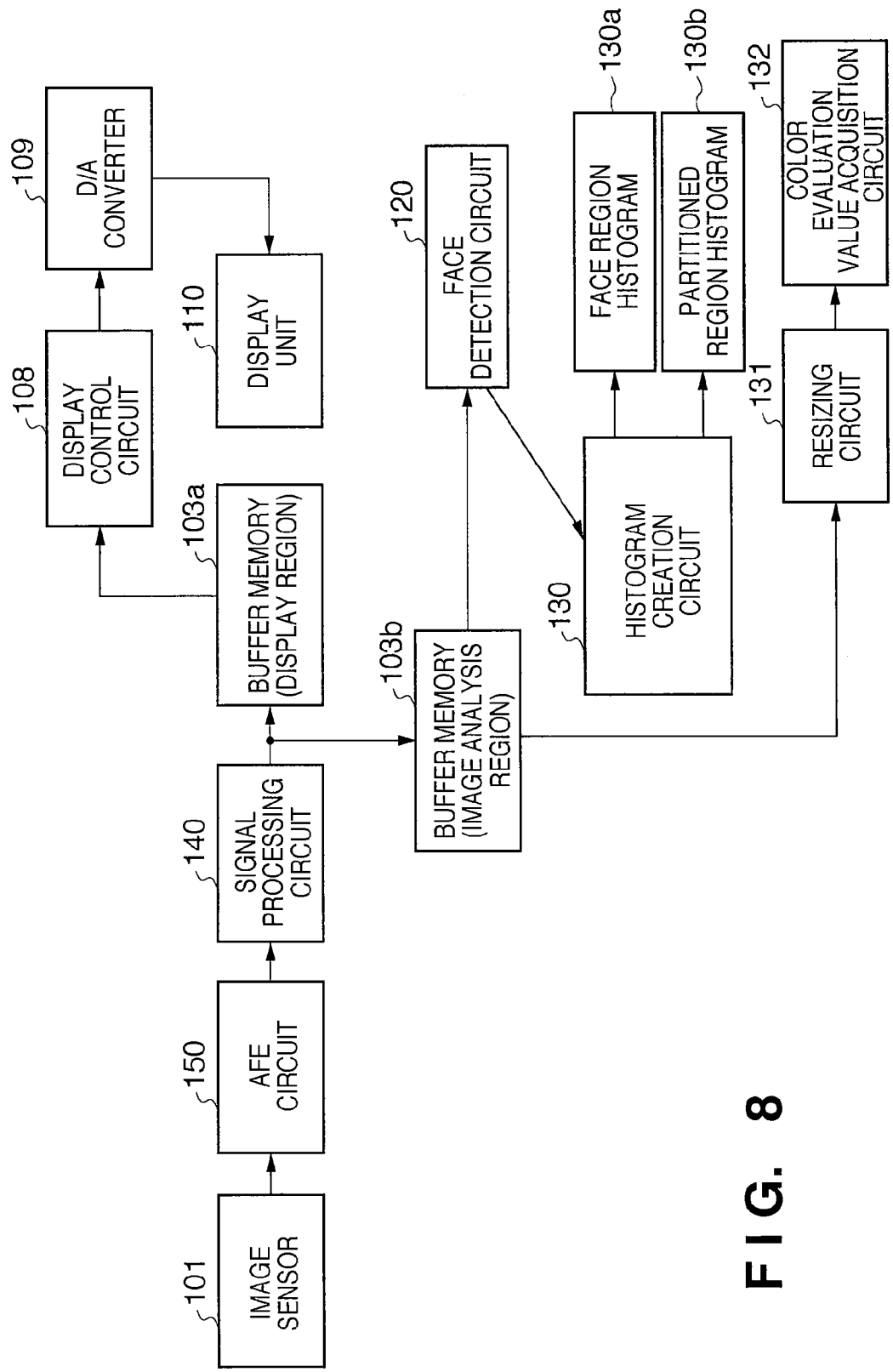
FIG. 8 is a block diagram showing the flow of signal processing during standing by to capture a still image, in the image capturing apparatus according to the embodiment of the present invention.

FIG. 8 is a block diagram showing the flow of signal processing during standing by to capture a still image, in the image capturing apparatus according to the present embodiment. As abovementioned, during standing by to capture a still image, the image capturing apparatus of the present embodiment performs continuous image capture and display for causing the display unit 110 to function as an EVF.

Analog image signals output from the image sensor 101 are gain adjusted (sensitivity adjusted) and digitized by the AFE circuit 150. So-called developing processes such as pixel interpolation and white balance correction are performed by the signal processing circuit 140 on this RAW image data, and YUV digital image data is generated.

This digital image data is stored in a display region (commonly called a VRAM or a display buffer) 103a of the buffer memory 103, and is output to the display unit 110 via the display control circuit 108 and the D/A converter 109.

On the other hand, the digital image data generated by the signal processing circuit 140 is also stored in an image analysis region (image analysis buffer) 103b of the buffer memory 103. The image data stored in the image analysis buffer 103b is used in face detection by the face detection circuit 120 and histogram creation by the histogram creation circuit 130. Note that not all of the EVF image data needs to be stored in the image analysis buffer 103b, and only the portion of EVF image data that depends on the cycle of performing face detection and histogram creation is stored.

The face detection circuit 120 performs face detection on image data stored in the image analysis buffer 103b, and if a face is detected, outputs a face detection result that includes information (e.g., position and size) that enables the face region to be specified.

The histogram creation circuit 130 creates a histogram, based on image data stored in the image analysis buffer 103b and the face detection result from the face detection circuit 120. As abovementioned, the histogram creation circuit 130 is able to create a face region histogram 130a for the face region, and a partitioned region histogram 130b for each region image obtained by partitioning the entire image.

The partitioned region histogram 130b can also be created for each region image including the face region, or derived for each region image excluding the face region, with regard to the entire image. The former is easily processed, but the latter is preferable in order to accurately detect whether the region with blown-out highlights is a face region or a background region.

As abovementioned, image capture is continuously repeated for the duration that the display unit 110 is being caused to function as an EVF, with the VRAM being rewritten in quick succession. Generally, the time needed for face detection and histogram creation is longer than the display cycle of EVF images (e.g., 1/30 sec.). For this reason, in the present embodiment, the image analysis buffer 103b is provided in addition to the VRAM, and the image analysis buffer 103b is not updated until face detection and histogram creation on image data stored in the image analysis buffer 103b has ended.

As a result of this configuration, it is possible to perform face detection and histogram creation on the same EVF image, and to perform image analysis easily and with a high degree of accuracy. Of course, there is no harm in executing face detection and histogram creation on each frame of the EVF images if this is possible, but there is no need to perform face detection and histogram creation on each frame, since it is generally unlikely that the captured scene will change greatly from frame-to-frame. Thus, the load on the system controller 107 can be reduced.

Also, image data stored in the image analysis buffer 103b is contracted by the resizing circuit 131, and color evaluation values are acquired by the color evaluation value acquisition circuit 132.

For example, assume that image data stored in the image analysis buffer 103b corresponds to a VGA-size image. The resizing circuit 131 firstly generates YUV 4:2:2 image data of 64 horizontal pixels by 48 vertical pixels, for example, from YUV 4:2:2 image data of 640 horizontal pixels by 480 vertical pixels. Subsequently, the resizing circuit 131 generates YUV 4:4:4 image data of 32 horizontal pixels by 24 vertical pixels by averaging Y with blocks composed of 4 pixels (2 pixels in horizontal direction and 2 pixels in vertical direction), and averaging UV with 2 pixels in the vertical direction.

Note that as for the resizing method in the resizing circuit 131, other methods may be used, such as averaging in prescribed units of a plurality of pixels, simple resampling, thinning by linear interpolation, and bicubic interpolation.

The color evaluation value acquisition circuit 132 computes luminance information Y, hue information H and saturation information C as color evaluation values for each block, with respect to the contracted YUV 4:4:4 image data of 32 horizontal pixels by 24 vertical pixels generated by the resizing circuit 131.

The color evaluation value acquisition circuit 132 is able to compute the color evaluation values using the following equations, for example.

$$Y=Y$$

$$C=\sqrt{U^2+V^2}$$

$$H=\tan^{-1}(U/V)$$

Of course, the color evaluation values may be evaluation values in CIELab color space, or evaluation values in another color space. Also, computation of color evaluation values may be performed using a math library for performing the above arithmetic operations or may by simulated by referring to a lookup table prepared in advance.

Luminance information, hue information and saturation information can thereby be acquired as color evaluation values for each block obtained by partitioning the entire image into blocks of 32 horizontal pixels by 24 vertical pixels.

Figure 9:
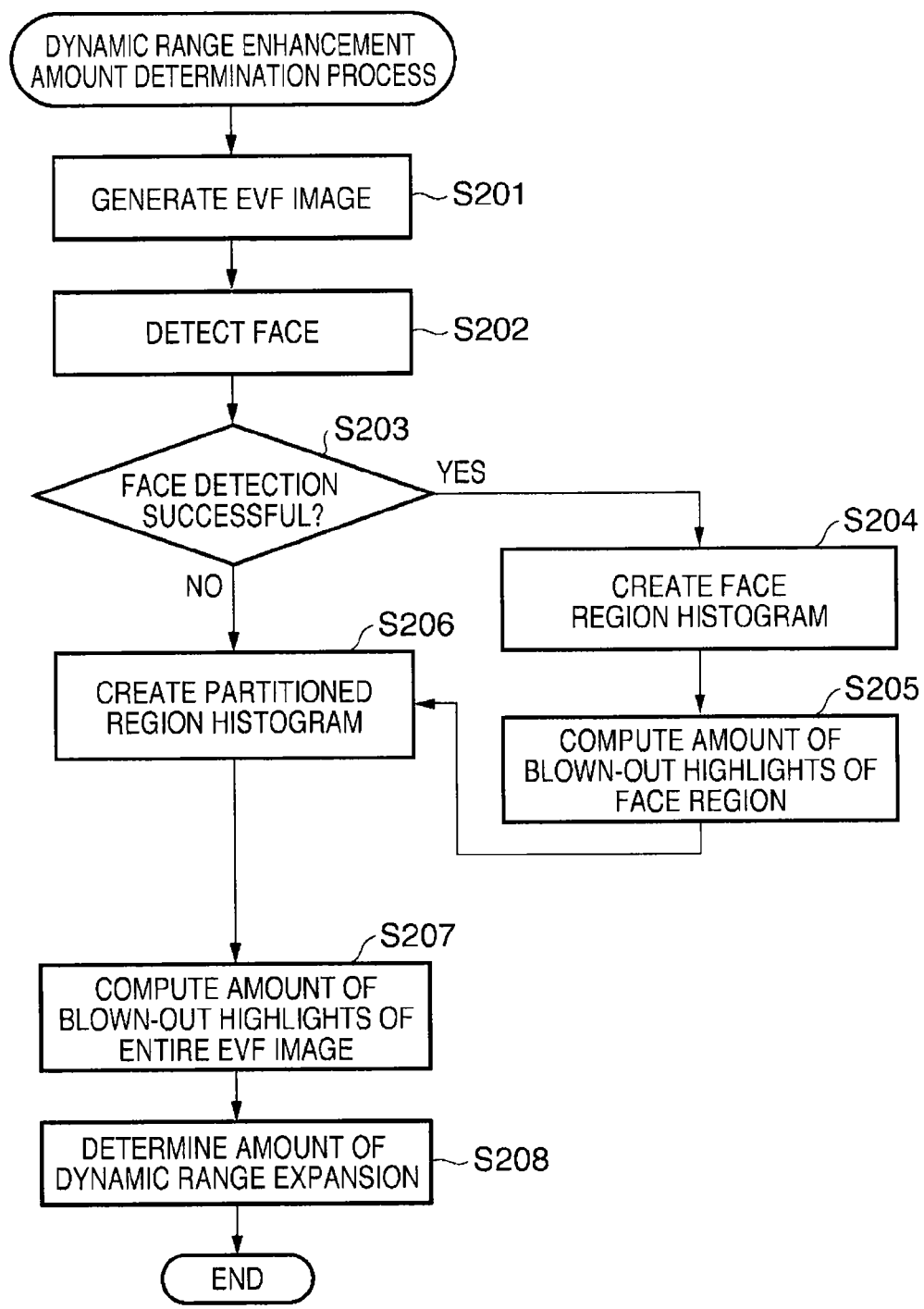
FIG. 9 is a flowchart illustrating an operation for determining an amount of dynamic range (D-range) expansion in the image capturing apparatus according to the embodiment of the present invention.

FIG. 9 is a flowchart illustrating an operation for determining an amount of dynamic range expansion (D+) in the image capturing apparatus of the present embodiment.

In the present embodiment, the amount of blown-out highlights in captured images is derived based on face detection results and histogram creation results with respect to EVF images, and the dynamic range expansion amount is determined according to the amount of blown-out highlights. The exposure and sensitivity for when performing actual image capture are adjusted using the amount of dynamic range expansion determined in advance using EVF images.

At S201, the system controller 107, as abovementioned, continuously performs image capture, causes EVF images to be generated, and causes the EVF images to be stored in the display buffer 103a sequentially from the signal processing circuit 140. The system controller 107 also causes the EVF images to be stored in the image analysis region (image analysis buffer) 103b of the buffer memory 103 at a predetermined cycle.

At S202, the face detection circuit 120 performs face detection on an EVF image stored in the image analysis buffer 103b.

In the case where face detection is successful (S203: YES), the histogram creation circuit 130 creates a face region histogram from the face region of the EVF image based on the face detection result from the face detection circuit 120 (S204).

At S205, the system controller 107 computes the amount of blown-out highlights of the face region from the face region histogram.

If face detection is not successful (S203: NO), or after computation of the amount of blown-out highlights of the face region, the histogram creation circuit 130, at S206, creates a partitioned region histogram for each region image obtained by partitioning the entire EVF image. Here, as an example, assume that the histogram creation circuit 130 creates a partitioned region histogram for each of the 16 partitioned regions obtained by quartering an entire EVF image horizontally and vertically.

At S207, the system controller 107 computes the amount of blown-out highlights of the entire EVF image from the partitioned region histograms.

At S208, the system controller 107 determines the amount of dynamic range expansion, based on at least the amount of blown-out highlights for the entire image derived at S207.

Next, a specific example of the process of computing the amount of blown-out highlights performed by the system controller 107 at S205 and S207 of FIG. 9 will be described.

Firstly, the process of computing the amount of blown-out highlights of the face region will be described.

At S205, the system controller 107 computes, as the amount of blown-out highlights of the face region, a luminance value YHiFace at which the cumulative frequency of a cumulative histogram is a prescribed value (90% in the FIG. 7 example), from the face region histogram created at S204.

At S208, the system controller 107 then determines the amount of dynamic range expansion for the face region (D+ (face)), according to the relative size relation between the value of the amount of blown-out highlights of the face region YHiFace and predetermined threshold values.

Specifically, when the predetermined threshold values are the three steps of THHiFace, THMidFace and THLowFace in descending order, for example, the amount of dynamic range expansion for the face region will be determined as follows:

$$D+(\text{face})=\text{Correction Level 1 Step(if}$$
$$Y\text{HiFace}>TH\text{HiFace})$$

D+(face)=Correction Level 2/3 Steps(if
    *TH*HiFace≥*Y*HiFace>*TH*MidFace)

D+(face)=Correction Level 1/3 Steps(if
    *TH*MidFace≥*Y*HiFace>*TH*LowFace)

D+(face)=Correction Level 0 Steps(if
    *TH*LowFace≥*Y*HiFace)

Also, at S206, the system controller 107 computes the luminance value YHi_n (n=1 to several partitions; 16 in FIG. 7 example) at which the cumulative frequency of a cumulative histogram is a prescribed value (80% in FIG. 7 example), as the amount of blown-out highlights of the partial region, with regard to each partitioned region histogram created at S206.

At S207, the system controller 107 counts the number of regions YH_BNum in which the luminance value YHi_n exceeds the predetermined threshold value Y_B_Th. The system controller 107 then determines the amount of dynamic range expansion for the entire image (D+(background)), according to the relative size relation between the number of regions YH_BNum and predetermined threshold values.

Specifically, when the predetermined threshold values are ThYH_BNum6 to ThYH_BNum0 in descending order, for example, the amount of dynamic range expansion for the entire image will be determined as follows:

D+(background)=Correction Level 6/3 Steps(if
    YH_*B*Num>Th*YH*_*B*Num6)

D+(background)=Correction Level 5/3 Steps(if
    Th*YH*_*B*Num6≥YH_*B*Num>Th*YH*_*B*Num5)

D+(background)=Correction Level 4/3 Steps(if
    Th*YH*_*B*Num5≥YH_*B*Num>Th*YH*_*B*Num4)

D+(background)=Correction Level 3/3 Steps(if
    Th*YH*_*B*Num4≥YH_*B*Num>Th*YH*_*B*Num3)

D+(background)=Correction Level 2/3 Steps(if
    Th*YH*_*B*Num3≥YH_*B*Num>Th*YH*_*B*Num2)

D+(background)=Correction Level 1/3 Steps(if
    Th*YH*_*B*Num2≥YH_*B*Num≥Th*YH*_*B*Num1)

D+(background)=Correction Level 0 Steps(if Th*YH*_
    *B*Num1≥YH_*B*Num)

In other words, the system controller 107 determines the amount of dynamic range expansion to be larger the greater the area of the blown-out highlights region in the image.

Note that the method of determining the blown-out highlights region is not limited to the method using cumulative histograms described here, and other arbitrary methods can be used.

At S208, the system controller 107 determines the final amount of dynamic range expansion. Here, in the case where face detection is successful, the system controller 107 determines the final amount of dynamic range expansion by comparing the amounts of dynamic range expansion determined at S205 and S207. For example, the system controller 107 is able to determine the larger amount of expansion as the final amount of dynamic range expansion, out of the amount of dynamic range expansion for the face region and the amount of dynamic range expansion for the entire image.

Alternatively, the system controller 107 may determine one of the amount of dynamic range expansion for the face region and the amount of dynamic range expansion for the entire image as the final amount of dynamic range expansion according to a shooting mode set by a mode dial or the like included in the operation unit 112. For example, in the case of a shooting mode for capturing a person (e.g., Portrait mode), the amount of dynamic range expansion for the face region can be determined as the final amount of dynamic range expansion, whereas in the case of a shooting mode for capturing a landscape (e.g., Landscape mode), the amount of dynamic range expansion for the entire image or background region can be determined as the final amount of dynamic range expansion.

Also, the amount of dynamic range expansion may be controlled according to the scene determination result. For example, the amount of dynamic range expansion of the background region may be expanded to 2 steps (6/3 steps) when the scene is determined to be a backlight scene, and otherwise stopped at 1 step (3/3 steps).

Also, a method other than one of the amount of dynamic range expansion for the face region and the amount of dynamic range expansion for the entire image being selected and determined as the final amount of dynamic range expansion may be employed. For example, the final amount of dynamic range expansion can also be determined according to the size of the amount of dynamic range expansion for the face region and the amount of dynamic range expansion for the entire image.

FIGS. 10A to 10D show specific examples of final amounts of dynamic range expansion determined according to the size of the amount of dynamic range expansion for the face region and the amount of dynamic range expansion for the entire image.

With the examples shown FIGS. 10A to 10C, the value of the final amount of dynamic range expansion determined is changed for each shooting mode. For example, in the case where the amount of dynamic range expansion for the face region is 1/3 steps, and the amount of dynamic range expansion for the entire image is 0/3 steps, the final amount of dynamic range expansion will be 1/3 steps in Auto mode (FIG. 10A) and Portrait mode (FIG. 10C), and 0/3 steps in Landscape mode (FIG. 10B).

Note that in the examples shown in FIGS. 10A to 10C, the amount of dynamic range expansion for the background image is up to 1 step (3/3 steps).

FIG. 10D shows an example in which the range of the final amount of dynamic range expansion determined according to the scene determination result is changed. In this example, if the scene is determined to be a backlight scene, the amount of dynamic range expansion for the face region remains up to 3/3 steps, but the amount of dynamic range expansion for the background region is extended up to 6/3 steps.

The system controller 107 stores the amounts of dynamic range expansion determined as described above in the buffer memory 103, and refers to the stored amounts when performing image capture. The operation of determining the amounts of dynamic range expansion can be performed every fixed number of frames of EVF images or every fixed period of time, for example, when in standby, and the latest amounts of dynamic range expansion are stored in the buffer memory 103.

Scene Determination

Next, scene determination operations in the image capturing apparatus of the present embodiment will be described.

While there are no particular restrictions on the type of scene determined by the image capturing apparatus of the present embodiment, operations for determining the presence of a person, a night scene, a blue sky scene, a sunset scene, a backlight scene, and macro shooting will be described here as examples.

In the present embodiment, scene determination is executed by the system controller 107, based on the following:

exposure information such as subject luminance (By value) obtained from a photometric sensor or a captured image subject distance information obtained with the auto focus operation color temperature information obtained by white balance control color evaluation values for each block obtained by the color evaluation value acquisition circuit 132 histograms obtained by the histogram creation circuit 130 orientation information of the image sensor obtained from the output of the orientation sensor 133

Night Scene Determination

The scene is determined to be a night scene if all of the following conditions (A1) to (A3) are satisfied:

(A1) By value is less than or equal to 0 [EV].

(A2) Average luminance value of the entire image computed from the color evaluation values for each block is less than or equal to a prescribed value.

(A3) Percentage of blocks within a prescribed range from the top of the image whose average luminance and average saturation obtained from the color evaluation values satisfy the following conditions is greater than or equal to a prescribed percentage:

average luminance less than or equal to prescribed value Y_Th_night average saturation less than or equal to prescribed value C_Th_night Note that the top and bottom of the image can be determined based on the output of the orientation sensor 133.

Also, the conditions may be changed depending on the range of By values.

Further, the mounting of a tripod may be taken into consideration. The mounting of a tripod can, in the case of the image capturing apparatus incorporating a vibration detection sensor for correcting camera shake, be judged from the output of the vibration detection sensor. The mounting of a tripod may also be determined based on the movement of the subject within a captured image. In the case of it being determined that a tripod is mounted, the scene may be determined to be a tripod night scene, as distinct from a normal night scene.

In the case of a tripod night scene without people, for example, exposure control such as lowering the ISO speed and making a long exposure may be performed, since there is little concern about camera shake or subject blur.

Also, in the case of a tripod night scene with people, desirably control of exposure and flash metering is performed, such that the brightness of the face region and the background are optimized.

Also, a better image is obtained by flattening the tone characteristics of dark portions (reducing to a low tone level), since the tendency is for shadows to stand out and noise to increase as a result of making a long exposure.

Blue Sky Scene Determination

The scene is determined to be a blue sky scene if all of the following conditions (B1) to (B4) are satisfied:

(B1) By value is greater than or equal to 5 [EV].

(B2) Subject distance at the time of shooting is greater than or equal to a prescribed value (i.e., not macro shooting).

(B3) Color temperature is in a prescribed color temperature range.

(B4) Percentage of blocks within a prescribed range from the top of the image whose average luminance, average hue and average saturation obtained from the color evaluation values satisfy the following conditions is greater than or equal to a prescribed percentage:

average luminance within prescribed range ($\geq$Y_Th_Sky_Low, $\leq$Y_Th_Sky_Hi)

average hue within prescribed range ($\geq$Hue_Th_Sky_Low, $\leq$Hue_Th_Sky_Hi)

average saturation within prescribed range ($\geq$C_Th_Sky_Low, $\leq$C_Th_Sky_Hi)

Also, the conditions may be changed depending on the range of By values.

For example, in the case of a blue sky scene without people, there is considered to be a high probability of the scene being a landscape shot. For this reason, a better image is obtained when processing such as enhancing saturation for the entire image such as blue and other colors and increasing contrast is performed.

Also, in the case of a blue sky scene with people, there is a high probability of the scene being a landscape snap shot. For this reason, an appropriate image is obtained when enhancement of near skin color saturation is restrained while enhancing blue saturation, and AE and tone characteristic settings are performed such that exposure and tone of the face is optimized.

Sunset Scene Determination

The scene is determined to be a sunset scene if all of the following conditions (C1) to (C7) are satisfied.

(C1) By value is greater than or equal to 7 [EV].

(C2) Subject distance at the time of shooting is greater than or equal to a prescribed value (i.e., not macro shooting).

(C3) Average Luminance value of the entire image computed from the color evaluation values is less than or equal to a prescribed value.

(C4) Percentage of high luminance blocks with an average luminance greater than or equal to a prescribed value is greater than or equal to a prescribed percentage.

(C5) Percentage of blocks whose average luminance, average hue and average saturation obtained from the color evaluation values satisfy the following conditions is greater than or equal to a prescribed percentage:

average luminance within prescribed range ($\geq$Y_Th_Sunset_Low, $\leq$Y_Th_Sunset_Hi)

average hue within prescribed range ($\geq$Hue_Th_Sunset_Low, $\leq$Hue_Th_Sunset_Hi)

average saturation within prescribed range ($\geq$C_Th_Sunset_Low, $\leq$C_Th_Sunset_Hi)

(C6) Number of blocks that do not satisfy one of the following conditions is less than or equal to a prescribed value:

condition (C5) of sunset scene determination condition (B4) of blue sky scene determination average saturation less than or equal to prescribed value average luminance greater than or equal to prescribed value (high luminance block)

average luminance less than or equal to prescribed value (low luminance block)

(C7) Histograms of hue and saturation in the color evaluation values have dispersions greater than or equal to prescribed values.

Also, the conditions may be changed depending on the range of By values. Smeared regions may also be eliminated based on the color evaluation values.

If the scene is determined to be a sunset scene, a better image is obtained when enhancement of the saturation of reds and oranges and WB setting in the high color temperature direction of clouds and the like are performed, together with performing AE control to slightly underexpose.

Backlight Scene Determination (1) Case where a Face is Detected

The scene is determined to be a backlight scene with people if the difference between the average luminance derived from the color evaluation values of blocks corresponding to the face region and the average luminance derived from the color evaluation values of other blocks is greater than or equal to a prescribed EV value.

(2) Case where a Face is not Detected

If AE control converges for a fixed period of time, the entire image is partitioned into four types of regions A to D in order from the outside, as shown in FIG. 5B, and the average luminance value for each region is computed from the color evaluation values of the blocks corresponding to the respective regions.

The average luminance value of the region A is compared with the respective average luminance values of the regions B to D, and if a difference greater than or equal to a prescribed EV value is detected, the scene is determined to be a backlight scene without people.

Apart from the method discussed here, luminance information obtained by partitioning a CCD-RAW image into blocks or histogram information may be used.

The backlight determination in the present embodiment involves detecting a two-dimensional luminance pattern, and differs from detecting the degree of blown-out highlights of luminance for each block or region, such as performed when detecting blown-out highlights. Accordingly, backlight scene determination and detection of blown-out highlights are different processes.

However, since there is considered to be a high possibility of a scene determined to be a backlight scene having tone loss in high luminance portions, a better image can be obtained by increasing the amount of dynamic range expansion if a scene is determined to be a backlight scene.

Macro Shooting Determination

Whether or not the scene involves macro shooting can be determined based on the focused subject distance. The subject distance can be obtained from the position of the focus lens, for example, with reference to a preset correspondence table. The scene is determined to involve macro shooting if the subject distance is less than or equal to a prescribed value.

Since there is a high possibility of blown-out highlights occurring when flash shooting is performed at a short distance, desirably exposure control is performed such that the flash is fired as little as possible if the scene is determined to involve macro shooting. Also, in the case of flash shooting being performed, settings may be configured such that tone characteristics that fill in high brightness portions are used by the signal processing circuit 140, to ensure the tone of highlight portions does not readily become saturated.

Figure 13A:
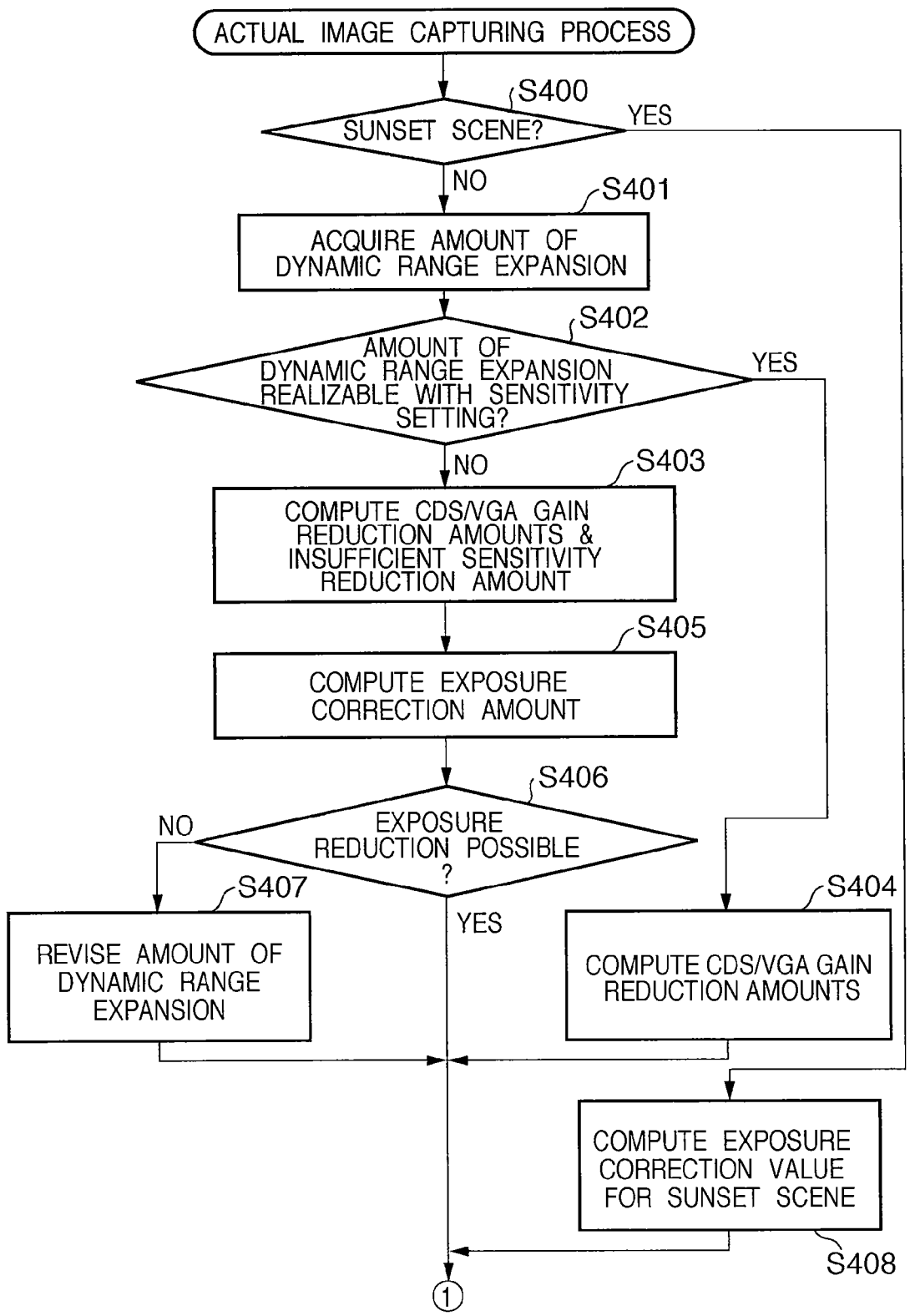
FIGS. 13A and 13B are flowcharts illustrating operation of the actual image capturing process, in the image capturing apparatus according to the embodiment of the present invention.
Figure 13B:
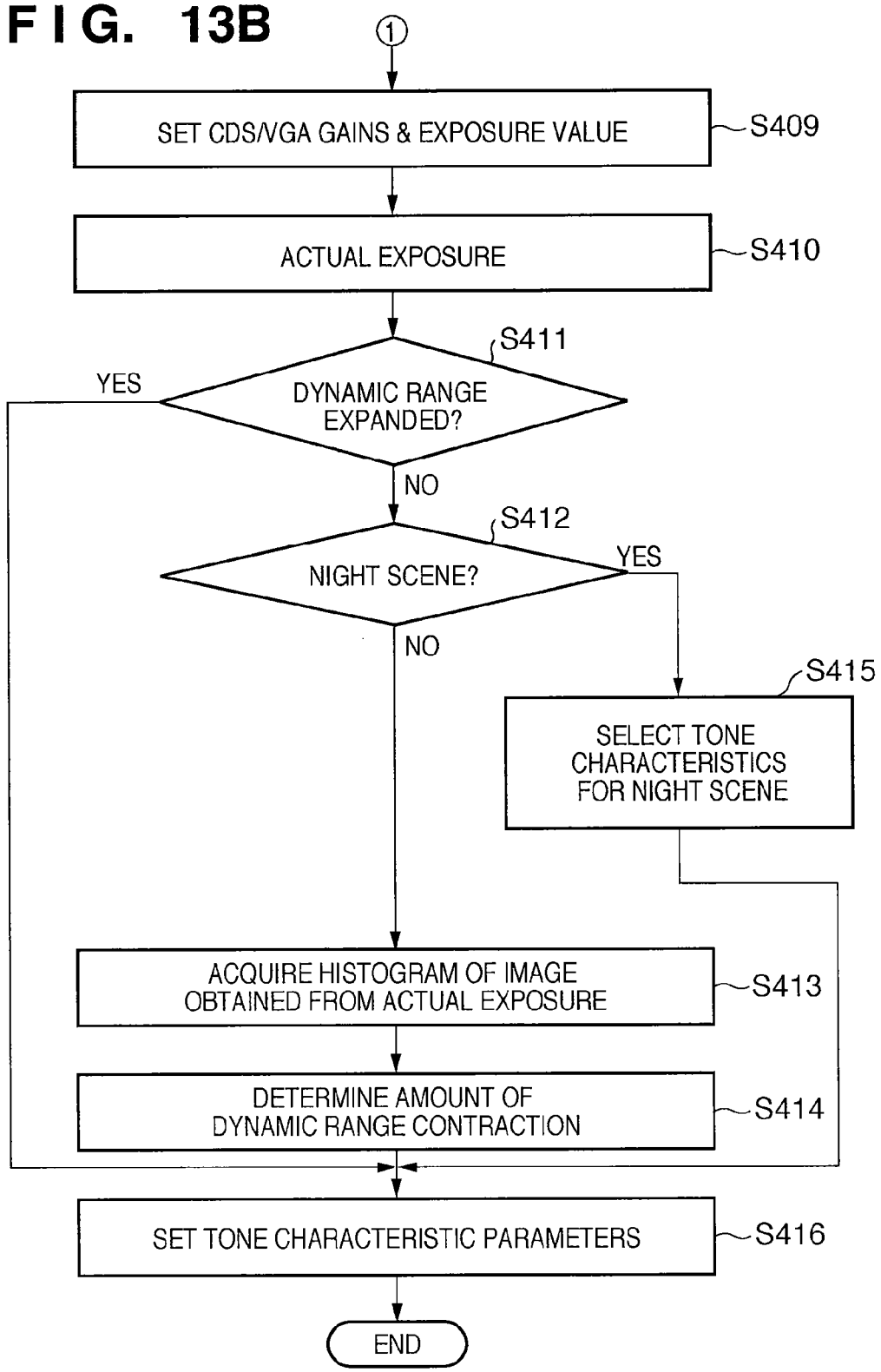

FIGS. 13A and 13B are flowcharts illustrating operation of the actual image capturing process in the image capturing apparatus of the present embodiment.

Note that it is assumed that, during standing by to capture a still image, the system controller 107 determines the amount of dynamic range expansion from EVF images at regular intervals, for example, using an abovementioned method. In the present embodiment, the amount of dynamic range expansion (amount by which an AE target value is decreased) can be determined with the four steps from 0/3 steps to 3/3 steps in 1/3 step increments. Note that the range and size per step of the amount of dynamic range expansion can be set arbitrarily. Also, when the shutter button included in the operation unit 112 is pressed a half stroke and an image capture preparation instruction is input, for example, the system controller 107 executes the abovementioned scene determination process, using EVF images and the results of AF control and AE control.

In response to the shutter button included in the operation unit 112 being pressed a full stroke and an image capture start instruction being input, during standing by to capture a still image, the system controller 107 then starts the following processing.

At S400, the system controller 107 judges whether it was determined in the scene determination that the scene is a sunset scene. If determined to be a sunset scene, the system controller 107, at S408, computes the exposure correction amount for a sunset scene, and does not compute the amount of dynamic range expansion. On the other hand, if not determined to be a sunset scene, the system controller 107, at S401, acquires, from the buffer memory 103, the amount of dynamic range expansion determined immediately before the image capture start instruction was input.

At S402, the system controller 107 determines whether the acquired amount of dynamic range expansion, that is, the amount by which the AE target value is to be decreased can be realized by sensitivity adjustment in the AFE circuit 150 (control of CDS gain circuit and VGA gain circuit). This determination can be performed by comparing the range of sensitivity adjustable by the AFE circuit 150 and the amount of dynamic range expansion acquired at S401. In the case where the decreasing of sensitivity (decreasing of gain) equivalent to the amount of dynamic range expansion cannot be performed, the system controller 107 judges that the amount of dynamic range expansion cannot be realized with only sensitivity adjustment by the AFE circuit 150.

In the case where the amount of dynamic range expansion can be realized with sensitivity adjustment in the AFE circuit 150, the system controller 107 computes, at S404, the gain setting as an image capture condition. Note that there are no particular restrictions on the way in which the CDS gain and VGA gain are combined in the setting, and setting is possible with an arbitrary combination.

On the other hand, if judged that the amount of dynamic range expansion cannot be realized with only sensitivity adjustment in the AFE circuit 150, the system controller 107 changes an exposure condition, based on the insufficient amount of gain that will remain even if available gain control is performed by the AFE circuit 150 (S405). Specifically, the system controller 107 computes the exposure correction amount for realizing the insufficient amount of gain.

Exposure correction here is minus correction, and can be realized by a common method, such as reducing the aperture, increasing the shutter speed, or inserting a neutral density filter (ND filter).

At S406, the system controller 107 determines whether the exposure correction computed at S405 is possible. For example, with an image capturing apparatus that does not have a ND filter, minus correction of the exposure cannot be performed in the case where the highest shutter speed and the smallest aperture (maximum aperture value) have already been set by auto exposure control. Also, the shutter speed cannot be raised in the case where the highest settable shutter speed has been set, when performing flash image capture. The same applies in cases such as where the maximum shutter speed has been determined. Note that because it is desirable not to change an aperture value set by the user if in aperture priority AE mode, it may be determined that minus correction is not possible if the shutter speed is already at the highest setting. The same applies if in shutter priority AE mode.

If determined that minus correction of exposure equivalent to the insufficient amount of gain remaining after gain adjustment is not possible, the system controller 107, at S407, revises the amount of dynamic range expansion to the maximum value realizable by sensitivity adjustment and exposure correction. The system controller 107 then computes the gain amount to be set in the AFE circuit 150, and further computes the exposure correction amount as required.

At S409, the system controller 107 sets the gain amount as an image capture condition in the CDS gain circuit 152 and the VGA gain circuit 154 of the AFE circuit 150. Also, in the case of performing exposure correction, the system controller 107 changes exposure parameters that depend on the AE result (settings such as shutter speed, aperture, ND filter use) according to the amount of exposure correction, and sets the changed exposure parameters in the lens apparatus 200 as image capture conditions.

At S410, the system controller 107 performs still image capture (actual exposure).

At S411, the system controller 107 determines whether the dynamic range has been expanded in processing prior to the actual exposure. Here, the system controller 107 determines that the dynamic range has not been expanded, if the amount of dynamic range expansion is 0 steps or if the scene was determined to be a sunset scene at S400.

At S412, the system controller 107 judges whether it was determined in the scene determination process prior to the actual exposure that the scene is a night scene. If determined to be a night scene, the system controller 107, at S415, selects tone characteristics for a night scene that depend on the amount of dynamic range expansion. If not determined to be a night scene, the system controller 107, at S413, computes a histogram from the image for actual exposure, and, at S414, determines the amount of dynamic range contraction (D– amount).

Figure 14A:
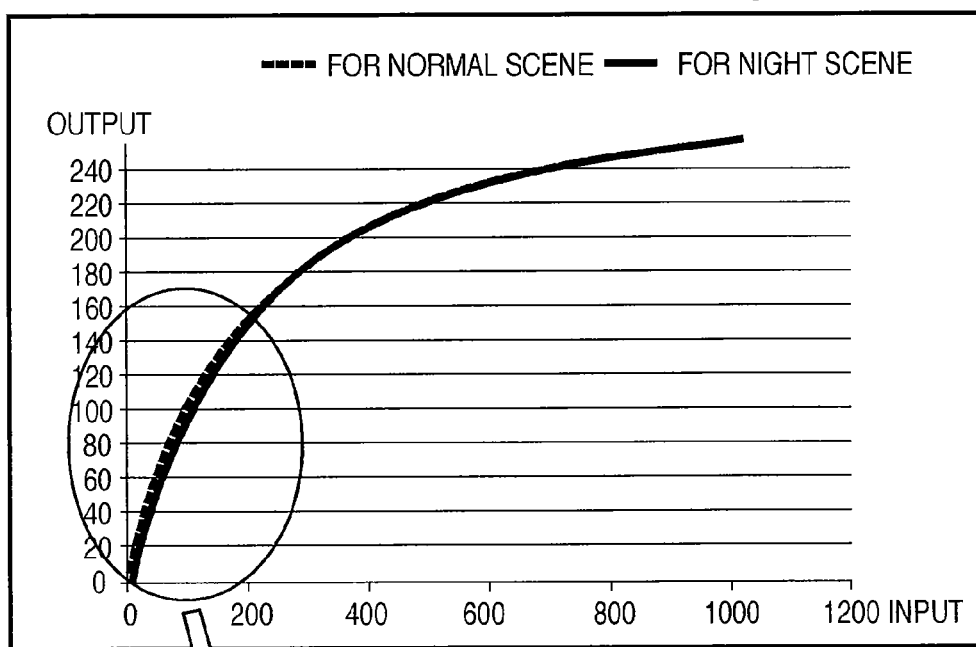
FIGS. 14A and 14B show an example of tone characteristics selected when the scene is determined to be a night scene, in the image capturing apparatus according to the embodiment of the present invention.
Figure 14B:
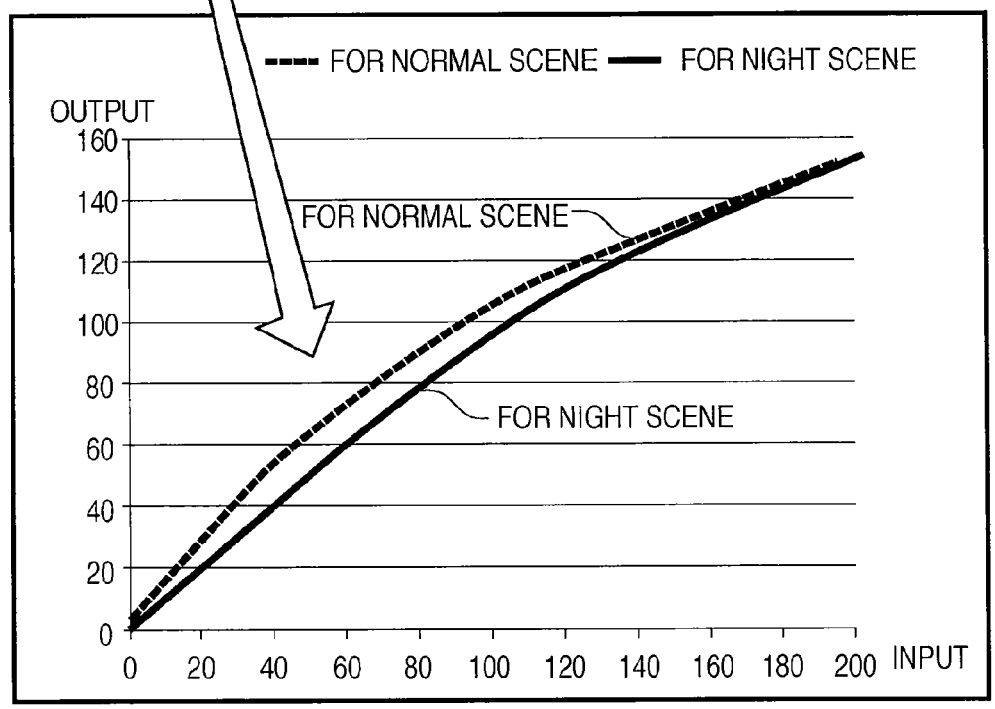

FIGS. 14A and 14B show an example of tone characteristics selected when the scene is determined to be a night scene. As illustrated, noise in dark portions can be made less prominent, and an appropriate image with sharp shadows is obtained as an image for when shooting a night scene, by flattening the characteristics of dark portions relative to normal tone characteristics (rate of increase of output luminance values is lowered relative to the rate of increase of input luminance values).

Of course, these tone characteristics may be changed depending on sensitivity, aperture, zoom position and the like. For example, the degree to which shadows are filled in may be reduced, since the peripheral brightness of the lens tends to fall when the aperture is released.

At S416, the system controller 107 sets, in the signal processing circuit 140, tone characteristics that depend on the amount of dynamic range expansion (excluding the case where the expansion amount is zero or the scene is determined to be a sunset scene), the tone characteristics for a night scene selected at S415, or tone characteristics that depend on the amount of dynamic range contraction determined at S414.

Figures 11A, 11B:
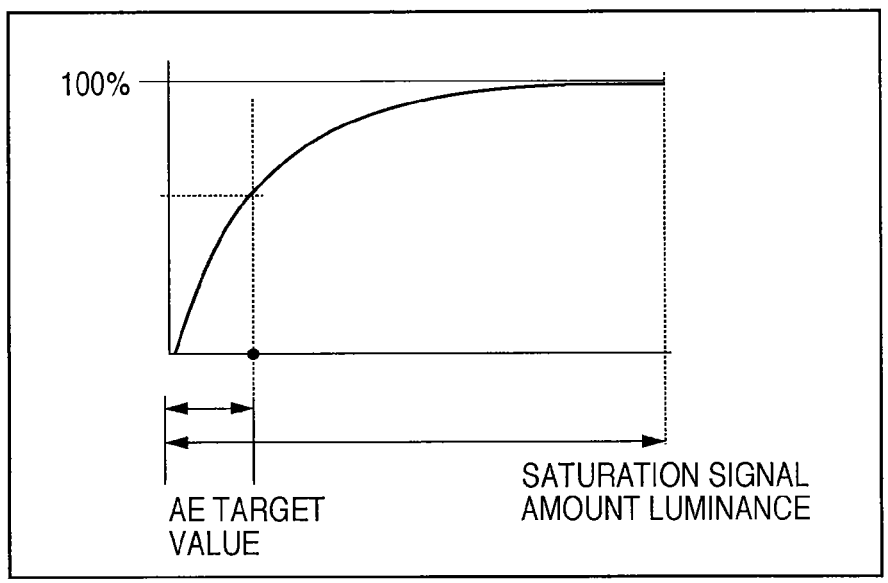
FIG. 11A represents a conceptual view of the D-range in the image capturing apparatus according to the embodiment of the present invention.
FIG. 11B shows an example of the relation between AE target value, saturation signal value and D-range, in the image capturing apparatus according to the embodiment of the present invention.

FIG. 11A represents a conceptual view of the dynamic range in the present embodiment.

In the present embodiment, the dynamic range is defined as the ratio of the saturation signal amount luminance of the image sensor to correct luminance. Correct luminance is a luminance target value level for when performing automatic exposure control (AE), and is equivalent to an average value of screen luminance if the AE mode is an average metering mode, for example.

Accordingly, the dynamic range can be defined as follows:

dynamic range=sensor saturation signal amount luminance/*AE* target value

Note that the AE target value here is based on an output signal from the image sensor 101 prior to sensitivity adjustment being performed by the AFE circuit 150.

The AE target value may be changed according to the AE mode, and even in the case of there being an evaluative metering mode and a spot metering mode, an AE target value for each mode can be used.

FIG. 11B shows an example of the relation between AE target value, saturation signal value and dynamic range.

It is clear from FIG. 11B that the dynamic range can be increased by lowering the AE target value.

FIGS. 12A and 12B show an example setting of tone characteristics in the signal processing circuit 140 of the present embodiment.

An example setting of tone characteristics (brightness correction amount) in the case where the amount of dynamic range expansion is set to the four steps of normal (0/3 steps), +1/3 steps, +2/3 steps, and +3/3 steps is shown.

Here, the AE target values corresponding to respective amounts of dynamic range expansion are the same as those shown in FIG. 11B. As shown in FIGS. 12A and 12B, the tone characteristics are set such that the AE target value after performing tone correction on the AE target value for each expansion of dynamic range will be a normal AE target value at which the dynamic range is not expanded, irrespective of the amount of dynamic range expansion.

As described using FIG. 11A and FIG. 11B, the dynamic range can be expanded by lowering the AE target value. However, simply lowering the AE target value results in underexposure and captured images will be dark. For this reason, the dynamic range can be expanded while correctly setting the brightness (exposure) of captured images, by performing tone correction in the signal processing circuit 140 so as to brighten the captured image data, according to the amount of dynamic range expansion.

Note that in the present embodiment, a configuration is illustrated in which a drop in the luminance of a captured image due to the AE target value being lowered is compensated by tone correction, but similar luminance correction may be performed using different means such as a lookup table.

Gain such as the gain of white balance coefficients for correcting white balance, and the clipping amount for determining the saturation signal amount may also be controlled. In other words, the same effect is obtained even if gain is increased by a downstream signal processing circuit, and the clipping amount is expanded (saturation signal amount increased) by the amount of the increase in gain, after A/D conversion has been performed on an image signal whose gain has been decreased by a decrease in the amount of exposure or a decrease in the AFE gain.

Here, the relation between the sensitivity setting (gain setting of the AFE circuit 150) and the saturation of the image sensor 101 will be described.

Generally, gain applied to the output signal of an image sensor is controlled, such that output satisfies a prescribed relation with respect to the amount of light and the exposure value of the camera (input).

However, there is an upper limit to the amount of charge that can be stored in the photodiodes of an image sensor. For this reason, when the gain applied by the AFE circuit 150 is lowered with the object of lowering the ISO speed of the image sensor, the maximum signal amount after the gain has been applied also drops. Accordingly, the saturation signal amount also drops together with the drop in gain.

Thus, configuring a desired sensitivity setting is possible disregarding amplification of noise, with regard to increasing the sensitivity of the image sensor, whereas a limit value arising from the saturation signal amount exists with regard to decreasing sensitivity.

In S409 of FIG. 13B, in the case where sensitivity cannot be lowered, it is often the case that the minimum settable sensitivity has already been set in the image capturing apparatus. This means that the gain applied to the output signal of the image sensor has already been decreased to a value equivalent to the minimum sensitivity. For this reason, sensitivity cannot be further decreased by controlling the gain of the AFE circuit 150. Accordingly, in the present embodiment, a further decrease in sensitivity is realized by exposure correction, in the case where the target amount by which the AE target value (sensitivity) is to be decreased cannot be realized by controlling the gain of the AFE circuit 150.

The operation for performing tone correction in the signal processing circuit 140 to correct brightness with respect to a dark image obtained when image capture is performed at a sensitivity decreased by exposure control is ultimately the same as increasing sensitivity, and produces degradation in image quality due to noise also being amplified when tone correction is performed.

However, in the present embodiment, decreasing the ISO speed with gain control is preferentially performed, in the case where decreasing of ISO speed corresponding to the amount of dynamic range expansion can be realized by the gain control of the AFE circuit 150. In the case where a decrease in ISO speed corresponding to the amount of dynamic range expansion cannot be realized only by gain control, the gain is decreased to a minimum value and the amount by which the decrease in sensitivity is deficient is made up for with exposure correction. In this case, noise itself is not significant, even if amplified when tone correction is performed, since the gain of the AFE circuit 150 has already been decreased to a level equivalent to the minimum sensitivity. For this reason, degradation in image quality can be minimized.

Figure 15:
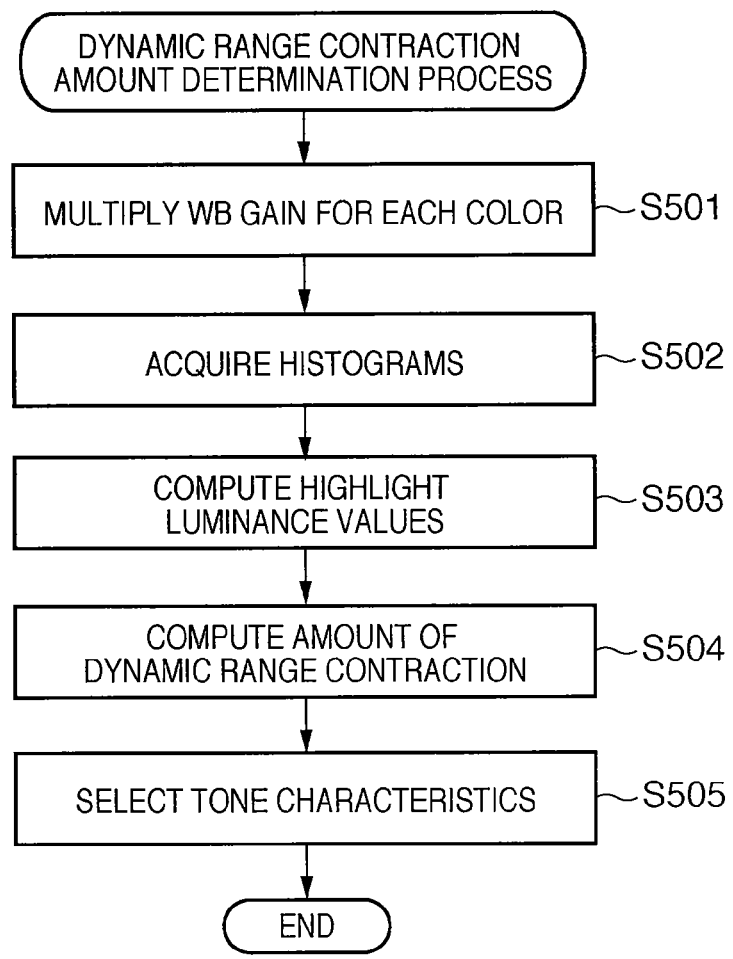
FIG. 15 is a flowchart illustrating operation of determining an amount of dynamic range contraction (D−), in the image capturing apparatus according to the embodiment of the present invention.

FIG. 15 is a flowchart illustrating operation of determining an amount of dynamic range contraction (D−) in the image capturing apparatus according to the embodiment of the present invention. The operation shown in FIG. 15 corresponds to the operation of acquiring a histogram at S413 and determining the amount of dynamic range contraction at S414 in FIG. 13B.

At S501, the system controller 107 multiplies the white balance coefficients (WB coefficients) for each of the colors R, G and B with respect to CCD-RAW image data stored in the buffer memory 103. The WB coefficients used here may be computed from an image resulting from actual image capture or may be computed from the EVF image immediately preceding actual image capture. Note that in the latter case, WB coefficients that depend on the color temperature of flash light or the WB coefficients of a D55 light source or daylight can be used in the case of flash shooting with actual image capture.

Multiplying WB coefficients enables the saturation amount for each color to be accurately detected, and enables detection even with a subject with respect to which a specific color is saturated.

At S502, the system controller 107 acquires a cumulative histogram for each color relating to the image obtained by multiplying the WB coefficients, using the histogram creation circuit 130.

At S503, the system controller 107 acquires, for each color as a highlight luminance value, a luminance value Y_Hp at which the frequency of the cumulative histogram is a prescribed value (e.g., 80%).

At S504, the system controller 107 computes the gain value Gain_yhp with respect to a predetermined saturation target value Sat_TargetY for each color with the following equation:

$$Gain\_yhp = Sat\_TargetY/Y\_hp$$

The system controller 107 then sets the smallest gain value out of the Gain_yhp values computed for each color as the gain value Gain_yhp corresponding to the final amount of dynamic range contraction.

At S505, the system controller 107 selects tone characteristic parameters corresponding to the gain value computed at S504.

FIG. 16 shows an example of the relation between final amounts of gain increase that depend on the final value of the gain value Gain_yhp computed at S504 and ISO speed.

Figure 17A:
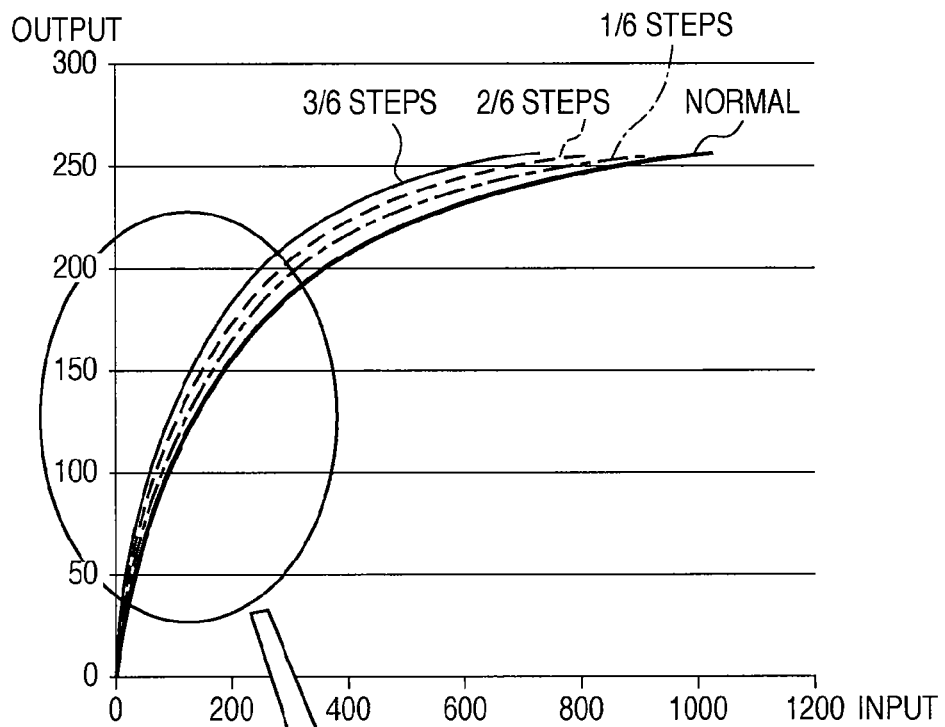
FIGS. 17A and 17B show the relation between amount of gain increase and tone characteristic setting value, in the image capturing apparatus according to the embodiment of the present invention.
Figure 17B:
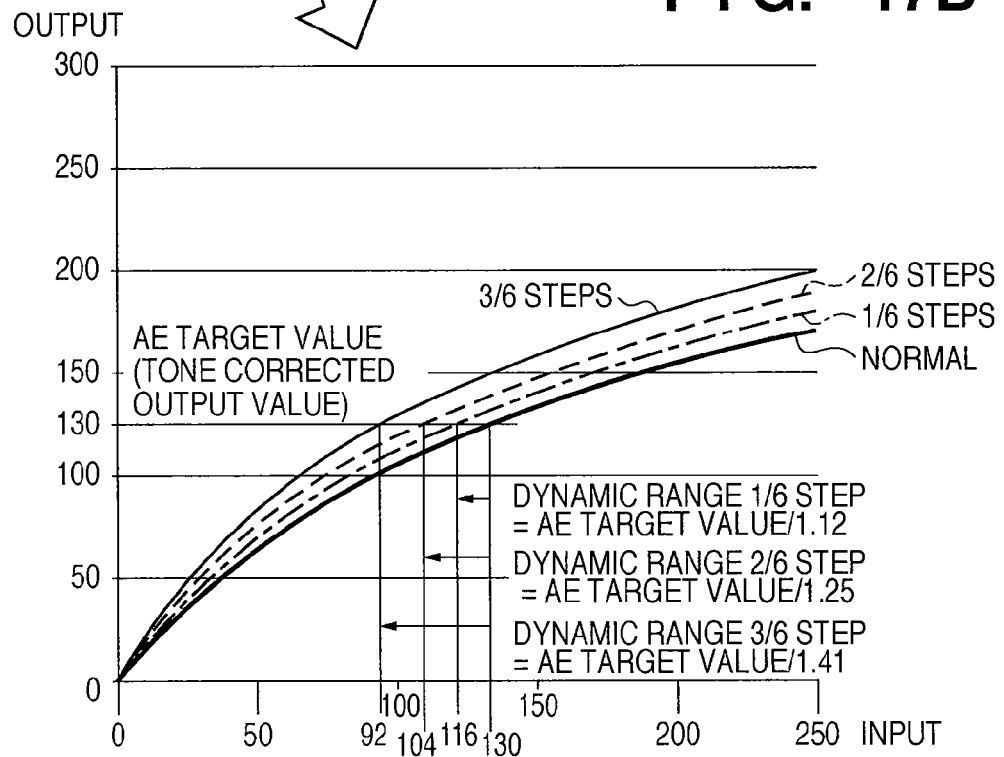

In the present embodiment, there are four final amounts of gain increase, namely, 0, 1.12, 1.25 and 1.41, and the system controller 107 respectively selects the following:

1.12→tone characteristic equivalent to a 1/6 step increase in exposure 1.25→tone characteristic equivalent to a 1/3 step increase in exposure 1.41→tone characteristic equivalent to a 1/2 step increase in exposure FIGS. 17A and 17B show the relation between amount of gain increase and tone characteristic setting value. Increasing exposure 1/6 steps is the same as increasing the AE target value 1/6 steps. The dynamic range contraction process thus corrects the tone characteristics of an image obtained by the actual exposure, and lightens the image by a number of steps that depends on the final amount of gain increase.

In the present embodiment, the amount of dynamic range contraction is varied by varying the tone characteristic setting, but the amount of dynamic range contraction can also be varied by controlling the WB coefficients using a lookup table or the like.

Also, in the present embodiment, histogram analysis is performed on the RAW image when the actual exposure is performed, and the amount of dynamic range contraction is determined. However, exposure control may be performed after performing histogram analysis on EVF images and determining the amount of dynamic range contraction, similarly to determining the amount of dynamic range expansion. In this case, because gain does not need to be increased using tone characteristics, contraction of dynamic range is possible without noise amplification due to the gain increase.

However, there are also cases where the extent of the blown-out highlights of an image cannot be judged until the actual exposure is performed, such as with flash shooting, for example. For this reason, exposure control may be performed after determining the amount of dynamic range contraction based on EVF images when the flash is not fired, and using the result of analyzing images obtained by the actual exposure when the flash is fired.

FIG. 18 shows an example of the relation between the setting of exposure control, dynamic range expansion process (D+), dynamic range contraction process (D−), and tone characteristics for a night scene, according to the scene determination result, in the image capturing apparatus according to the embodiment of the present invention. Note that, in the present embodiment, the dynamic range contraction process is performed if the dynamic range has not been expanded. Accordingly, in FIG. 18, the denoting of ○ (or ◎) for both D+ and D− indicates that execution of D+ or D− is possible, and does not indicate that both are performed.

If the scene is determined to be a night scene and people are not included (face not detected by the face detection circuit 120), a dynamic range expansion process tailored to the amount of dynamic range expansion determined based on EVF images is performed. Also, as abovementioned, tone characteristics that fill in dark parts are selected.

On the other hand, since the area of the dark portion is large in the case of a night scene, tone characteristics that increase sensitivity are selected when performing the dynamic range contraction process using the luminance information of a histogram or the like. However, the dynamic range contraction process (D−) is not performed with a night scene, since it is appropriate for a somewhat darker image to be captured in comparison to a normal scene.

On the other hand, if the scene is determined to be a night scene and people are included, the dynamic range expansion or dynamic range contraction process is performed, and tone characteristics for a night scene are not selected.

If people are included in a night scene, an appropriate image cannot be acquired when tone characteristics for a night scene are selected, since contrast on the face increases too much, and the tone characteristics of dark parts of the face are flattened. Also, flash shooting is often performed if people are included in a night scene, but the flash light often does not adequately reach the subject in the case of the subject distance being long, as in the case where image capture is performed with the telescopic end of a zoom lens. For this reason, performing the dynamic range contraction process enables an appropriate image to be acquired with regard to the face region of people and the like.

If the scene is determined to be a sunset scene and people are not included, exposure control is performed such that the image will be underexposed relative to when normal shooting is performed in the actual exposure, and the dynamic range expansion process is prohibited.

With a scene determined to be a sunset scene, the sun is often in the angle of view. For this reason, the effect of further performing minus correction and expanding the dynamic range is muted, since the result of auto exposure control tends toward underexposure. Rather, the dynamic range expansion process (D+) may increase the ISO speed, in which case the possibility increases of noise being amplified, and an inappropriate image resulting. Also, saturation is controlled so that red is enhanced.

Also, the brightness of the face cannot be controlled if the flash is not fired in the case where people are included in a sunset scene. Accordingly, an appropriate image can be acquired by performing the dynamic range expansion process (D+) or the dynamic range contraction process (D−), together with implementing exposure determination with priority for the face (face priority AE).

On the other hand, if people are included in a sunset scene and the flash will be fired, the brightness of the face can be controlled by controlling the flash metering. For this reason, an appropriate image can be acquired by underexposing when image capture is performed, and prohibiting the dynamic range expansion process, similarly to the case where people are not included. Also, in the case where people are included in a sunset scene, further enhancing of red is not performed, so as to not affect the skin tones.

If the scene is determined to be a backlight scene and people are not included, the scene will often be sufficiently bright. In other words, it will often be the case that a low ISO speed and a fast shutter speed have been set by the image capturing apparatus. As a result, there is a high possibility of not being able to perform the dynamic range expansion process. If people are not included and the main subject is a landscape, an image with little noise will often be more appropriate.

On the other hand, in the case where people are included, the people will often be in the shade or in a dark place in the room, and a sunny place or an outdoor area will form the background. Thus, in the case where, for instance, a different light source is mixed in a single shooting scene, the amount of dynamic range expansion will often not be sufficient at 1 step. Also, in cases such as a snap shot, shooting the face and the background is more appropriate.

Thus, with a backlight scene, a better image can be shot by increasing the amount of dynamic range expansion in the case of people being included, and not increasing the amount of dynamic range expansion in the case of people not being included. For example, with a normal scene determination result, the amount of dynamic range expansion is increased to a maximum of 1 step, whereas in the case where people are included in a backlight scene, the amount of dynamic range expansion is extended to 2 steps, for example.

Of course, the upper limit of the expansion amount determined in the dynamic range expansion process may, needless to say, be determined according to the degree to which ISO speed is raised. For example, control can be performed to increase the amount of dynamic range expansion in the case of a brightness level for shooting at a high sensitivity, and to decrease the amount of dynamic range expansion in other cases.

In the case of the scene being determined to be a blue sky scene, processing is similar to a normal scene, apart from enhancing blue saturation.

In the case where, however, the scene is determined to be a blue sky scene, and there are many blocks in the cyan hue direction with high luminance in blue portions, the upper limit of the amount of dynamic range expansion may be extended. This enables the amount of dynamic range expansion to be determined while actively determining the degree of blown-out highlights in sky portions.

Also, in the case of a portrait scene, the dynamic range expansion or contraction process is performed together with person priority AE.

In the case of a normal scene (i.e., not a night, sunset or backlight scene, and where people are not detected), an increase in noise can be suppressed by performing the dynamic range expansion process in a range in which the ISO speed remains unchanged, and only performing the dynamic range contraction process at a low ISO speed.

In the case where the scene is judged to be a blue sky scene (without people), processing is similar to a normal scene, apart from enhancing blue saturation.

In the case where, however, the scene is judged to be a blue sky scene, and there are many blocks in the cyan hue direction with high luminance in blue portions, the upper limit of the amount of dynamic range expansion may be extended. This enables the amount of dynamic range expansion to be determined while actively determining the degree of blown-out highlights in blue portions.

Other Embodiments

In the abovementioned embodiment, the case was described where dynamic range expansion by the present invention is applied in still image capture, but can be similarly applied when performing EVF image capture or moving image capture. In this case, the timing at which the parameters are set is adjusted such that the gain control (and exposure correction as required) of the AFE circuit 150 and tone correction in the signal processing circuit 140 are applied to the same image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-34392, filed on Feb. 17, 2009, No. 2009-26694, filed on Feb. 6, 2009, and No. 2009-26695, filed on Feb. 6, 2009, which are hereby incorporated by reference herein in their entirety.

What is claimed is:

1. An image capturing apparatus comprising:
a scene determining unit arranged to perform scene determination, based on information regarding a moving image captured prior to the capture of a still image;
a gain control unit arranged to control a gain value based on an output from the scene determination unit; and
a control unit arranged to control the image capturing apparatus to capture an image, and to selectively execute, based on the output from the scene determination unit, one of (a) a first process for capturing a still image at a decreased gain value, and applying, with respect to a captured still image, tone correction for compensating the decreased gain value, and (b) a second process for capturing a still image, and applying, with respect to a captured still image, tone correction for increasing the brightness of a low luminance portion of the captured still image, based on a characteristic of a high luminance portion of the moving image or the captured still image.

2. The image capturing apparatus according to claim 1, wherein the scene determining unit determines at least one of: a presence of a person, a night scene, a blue sky scene, a sunset scene, a backlight scene, and macro shooting.

3. The image capturing apparatus according to claim 1, wherein the control unit is arranged to execute the first process, in a case where the result of the scene determination does not indicate a predetermined scene on which the first process is not to be performed.

4. The image capturing apparatus according to claim 1, Wherein the control unit is arranged to execute the second process, in a case where the result of the scene determination indicates a predetermined scene on which the first process is not to be performed, and in a case where an amount of the decreased gain value in the first process is zero.

5. The image capturing apparatus according to claim 1, wherein in the first process, the greater an amount of blown-out highlights in an image on which the scene determination was performed, the greater an amount of the decreased gain value is determined by the control unit.

6. The image capturing apparatus according to claim 1, wherein the control unit, in the second process, is arranged to apply, to the captured still image, tone correction such that a luminance value at which a frequency of a cumulative histogram of the captured still image is a prescribed value will be a luminance value corresponding to a saturation signal amount of an image sensor included in the image capturing apparatus.

7. The image capturing apparatus according to claim 1, wherein, in a case where a scene is determined in the scene determination to be a night scene, the control unit is arranged to execute a third process of applying tone correction for decreasing a rate of increase in input-output characteristics in the low luminance portion.

8. An image capturing apparatus comprising:
a scene determining unit arranged to perform scene determination before the capture of a still image;
a gain control unit arranged to control a gain value based on an output from the scene determination unit; and
a control unit arranged to control the image capturing apparatus to capture an image, and to selectively execute, based on the output from the scene determination unit, one of (a) a first process for capturing a still image at a decreased gain value, and applying, with respect to a captured still image, tone correction for compensating the decreased gain value, and (b) a second process for capturing a still image, and applying, with respect to a captured still image, tone correction for increasing the brightness of a low luminance portion of the captured still image, based on a characteristic of a high luminance portion of a moving image or the captured still image.

9. A control method of an image capturing apparatus, comprising:
a scene determining step of performing scene determination, based on a moving image captured prior to the capture of a still image;
a gain control step of controlling a gain value based on a result of the scene determination in the scene determining step; and
a control step of controlling an image capturing operation, wherein in the control step, based on the result of the scene determination in the scene determining step, one of (a) a first process for capturing a still image at a decreased gain value, and applying, with respect to a captured still image, tone correction for compensating the decreased gain value, and (b) a second process for capturing a still image, and applying, with respect to a captured still image, tone correction for increasing the brightness of a low luminance portion of the captured still image, based on a characteristic of a high luminance portion of the moving image or the captured still image, is selectively executed.

10. A control method of an image capturing apparatus, comprising:
a scene determining step of performing scene determination before the capture of a still image;
a gain control step of controlling a gain value based on a result of the scene determination in the scene determination step; and
a control step of controlling an image capturing operation, wherein in the control step, based on the result of the scene determination in the scene determining step, one of (a) a first process for capturing a still image at a decreased gain value, and applying, with respect to a captured still image, tone correction for compensating the decreased gain value, and (b) a second process for capturing a still image, and applying, with respect to a captured still image, tone correction for increasing the brightness of a low luminance portion of the captured still image, based on a characteristic of a high luminance portion of a moving image or the captured still image, is selectively executed.

11. A non-transitory computer-readable recording medium having recorded thereon a program for causing a computer of an image capturing apparatus to execute the steps of the control method claimed in claim 9.

12. A non-transitory computer-readable recording medium having recorded thereon a program for causing a computer of an image capturing apparatus to execute the steps of the control method claimed in claim 10.

13. An image capturing apparatus comprising:
a scene determining unit arranged to perform scene determination; and
a control unit arranged to control the image capturing apparatus to selectively execute, based on an output from the scene determination unit, one of a first process and a second process,
wherein said first process includes a tone correction process for increasing a ratio of an input luminance value corresponding to the maximum output luminance value to a luminance target value used for automatic exposure control to be larger than a reference ratio, and said second process includes a tone correction process for decreasing the ratio to be less than the reference ratio.

14. The image capturing apparatus according to claim 13, wherein the control unit executes the tone correction according to an increased amount of the ratio in the first process.

15. The image capturing apparatus according to claim 13, wherein the control unit executes the tone correction according to a decreased amount of the ratio in the second process.

16. The image capturing apparatus according to claim 13, wherein, in the first process, the control unit increases the ratio to be larger than the reference ratio by decreasing the luminance target value to be less than a reference luminance target value.

17. The image capturing apparatus according to claim 14, wherein, in the first process, the control unit adjusts an exposure for when performing an actual image capture according to the decreased amount of the luminance target value.

18. The image capturing apparatus according to claim 14, wherein, in the first process, the control unit adjusts a gain value for when performing an actual image capture according to the decreased amount of the luminance target value.

19. A control method of an image capturing apparatus comprising:
scene determining step of performing scene determination; and
control step of controlling the image capturing apparatus to selectively execute, based on a determination result of the scene determination, one of a first process and a second process,
wherein said first process includes a tone correction process for increasing a ratio of an input luminance value corresponding to the maximum output luminance value to a luminance target value used for automatic exposure control to be larger than a reference ratio, and said second process includes a tone correction process for decreasing the ratio to be less than the reference ratio.

20. A non-transitory computer-readable recording medium having recorded thereon a program for causing a computer of an image capturing apparatus to execute the steps of the control method claimed in claim 19.

21. An image capturing apparatus comprising:
a control unit arranged to control the image capturing apparatus to selectively execute one of a first process and a second process for a captured image based on a scene,
wherein said first process includes a tone correction process for applying a bigger gain to signal of a low luminance portion than a gain applied to signal of a high luminance portion based on an exposure of the captured image, and said second process includes a tone correction process using a tone characteristics, which specifies a relation between input luminance values and corresponding output luminance values, and of which an input luminance value associated with a maximum output luminance value is changed based on the captured image.

22. A control method of an image capturing apparatus comprising:
control step of controlling the image capturing apparatus to selectively execute one of a first process and a second process for a captured image based on a scene,
wherein said first process includes a tone correction process for applying a bigger gain to signal of a low luminance portion than a gain applied to signal of a high luminance portion based on an exposure of the captured image, and said second process includes a tone correction process using a tone characteristics, which specifies a relation between input luminance values and corresponding output luminance values, and of which an input luminance value associated with a maximum output luminance value is changed based on the captured image.

23. A non-transitory computer-readable recording medium having recorded thereon a program for causing a computer of an image capturing apparatus to execute the steps of the control method claimed in claim 22.

* * * * *